US012093220B1

(12) United States Patent
Wang et al.

(10) Patent No.: US 12,093,220 B1
(45) Date of Patent: Sep. 17, 2024

(54) CONTROLLING LAYERS IN CONTAINER IMAGES TO REDUCE REDUNDANT CONTENT BETWEEN LAYERS

(71) Applicant: International Business Machines Corporation, Armonk, NY (US)

(72) Inventors: Da Long Wang, Hangzhou (CN); Zhan Peng Huo, Beijing (CN); Yu Sun, Shanghai (CN); Hong Yi Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/341,827

(22) Filed: Jun. 27, 2023

(51) Int. Cl.
*G06F 17/00* (2019.01)
*G06F 16/174* (2019.01)
*G06F 16/535* (2019.01)

(52) U.S. Cl.
CPC ........ G06F 16/1756 (2019.01); G06F 16/535 (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 8,015,440 B2 * | 9/2011 | Flynn | ...................... | G06F 1/183 |
| | | | | 714/6.24 |
| 8,930,949 B2 * | 1/2015 | Chen | ...................... | G06F 9/5061 |
| | | | | 709/201 |
| 9,294,347 B2 * | 3/2016 | Shetty | ................. | H04L 41/0803 |
| 10,146,563 B2 * | 12/2018 | Dettori | .................. | G06F 9/5027 |
| 10,402,213 B2 * | 9/2019 | Stefanov | ................. | G06F 9/455 |
| 10,534,671 B1 * | 1/2020 | Zhao | .................. | G06F 9/45558 |
| 11,748,153 B2 * | 9/2023 | Llamas Virgen | ... | G06F 11/3692 |
| | | | | 718/1 |

(Continued)

FOREIGN PATENT DOCUMENTS

CN 106528224 B 8/2020

OTHER PUBLICATIONS

Lin et al., "InDe: An inline data deduplication approach via adaptive detection of valid container utilization," J. ACM, vol. 37, No. 4, Article 111, Aug. 2018, 30 pages. https://dl.acm.org/doi/abs/10.1145/3568426.

(Continued)

*Primary Examiner* — Hung D Le
(74) *Attorney, Agent, or Firm* — Yee & Associates, P.C.

(57) ABSTRACT

A computer implemented method manages an image. A number of processor units identifies a set of base files in a set of image layers for a candidate file in a container layer in response to a request to create a new image with the candidate file. The number of processor units identifies delta data between the candidate file and the set of base files. The number of processor units creates the new image with a new top image layer using the delta data identified for the candidate file in the container layer. According to other illustrative embodiments, a computer system, and a computer program product for managing an image are provided. As a result, the illustrative embodiments provide a technical effect of reducing the size of images and reducing storage space used to store the images.

18 Claims, 14 Drawing Sheets

(56) References Cited

U.S. PATENT DOCUMENTS

| | | | |
|---|---|---|---|
| 2002/0091587 A1* | 7/2002 | Kenna, III | G06Q 30/0641 |
| | | | 705/26.5 |
| 2015/0067783 A1* | 3/2015 | Pulier | G06F 9/5072 |
| | | | 726/3 |
| 2015/0149475 A1* | 5/2015 | Nakahira | G06F 18/29 |
| | | | 707/741 |
| 2015/0309828 A1* | 10/2015 | Shaik | G06F 9/5083 |
| | | | 718/1 |
| 2015/0379287 A1* | 12/2015 | Mathur | G06F 21/602 |
| | | | 726/27 |
| 2016/0065664 A1* | 3/2016 | Tung | G06F 9/5027 |
| | | | 709/222 |
| 2016/0065680 A1* | 3/2016 | Harper | G06F 9/45558 |
| | | | 709/225 |
| 2016/0098287 A1* | 4/2016 | Prasad | G06F 9/5077 |
| | | | 718/1 |
| 2016/0164797 A1* | 6/2016 | Reque | G06F 9/5077 |
| | | | 718/1 |
| 2016/0378519 A1* | 12/2016 | Gaurav | G06F 9/5077 |
| | | | 718/1 |
| 2017/0010912 A1* | 1/2017 | Perlegos | G06N 20/00 |
| 2018/0088926 A1* | 3/2018 | Abrams | H04L 67/568 |
| 2019/0266259 A1* | 8/2019 | Chen | G06F 3/0608 |
| 2019/0354382 A1* | 11/2019 | Ross | G06F 9/44505 |
| 2019/0354389 A1* | 11/2019 | Du | G06F 9/45545 |
| 2020/0082094 A1* | 3/2020 | Mcallister | G06F 8/77 |
| 2020/0142680 A1* | 5/2020 | Varadharajan Kannan | |
| | | | G06F 8/63 |
| 2022/0114037 A1* | 4/2022 | Jobi | G06F 9/455 |
| 2022/0229647 A1* | 7/2022 | Mathews | G06F 8/433 |
| 2023/0091587 A1 | 3/2023 | Jang | |
| 2023/0229561 A1* | 7/2023 | Iyer | G06F 11/1438 |
| | | | 711/162 |
| 2023/0367565 A1* | 11/2023 | O'Connor | G06F 8/41 |
| 2023/0418594 A1* | 12/2023 | Griffin | G06F 8/71 |
| 2023/0418681 A1* | 12/2023 | Coady | G06F 9/5072 |
| 2024/0004997 A1* | 1/2024 | Oliver | G06F 21/56 |

OTHER PUBLICATIONS

Liu et al., "Self-Healing Corrupted Segments within a Deduplication Backup System for Cloud Storage," An IP.com Prior Art Database Technical Disclosure, IPCOM000230953D, Sep. 20, 2013, 7 pages. https://priorart.ip.com/IPCOM/000230953.

Lu et al., "An Acceleration Method for Docker Image Update," 2019 IEEE International Conference on Fog Computing (ICFC), Jun. 24-26, 2019, 9 pages. https://ieeexplore.ieee.org/document/8822199.

* cited by examiner

| FILE NAME | PREVIOUS COPY LAYER | FILE TYPE | SAME DATA RANGE |
|---|---|---|---|
| A | LAYER 3 | DELTA | R3 |
| A | LAYER 1 | FULL | R1 |

US 12,093,220 B1

CONTROLLING LAYERS IN CONTAINER IMAGES TO REDUCE REDUNDANT CONTENT BETWEEN LAYERS

BACKGROUND

The disclosure relates generally to an improved computer system and more specifically to managing layers in images to reduce redundant content between layers in an image.

Containers are packages of software that contain the necessary components to run in different environments. Containers virtualize the operating system and can run anywhere from a data center, a personal computer, or in a cloud computing environment. Containers provide a lightweight isolated environment for applications to run consistently across different systems. Containers can reduce or eliminate compatibility issues between an application running in the container and ecosystem. Additionally, containers increase scalability allowing for applications to be replicated and distributed across multiple computers.

Images are packages for files that contain the necessary components to run a program or application in a container. For example, an image can include the code for an application, libraries, dependencies, and other files or configurations needed by the application. An image can include the different components needed to start the application.

In running an application, a container uses the image as a starting point to set up an isolated environment for the application to run. The container ensures that the application has what is needed to run such as settings, files, and resources. In other words, an image provides a starting point to initialize and run an application in a container. Millions of container images can be built and distributed over a network or the Internet to run container applications.

SUMMARY

According to one illustrative embodiment, a computer implemented method manages an image. A number of processor units identifies a set of base files in a set of image layers for a candidate file in a container layer in response to a request to create a new image with the candidate file. The number of processor units identifies delta data between the candidate file and the set of base files. The number of processor units creates the new image with a new top image layer using the delta data identified for the candidate file in the container layer. According to other illustrative embodiments, a computer system and a computer program product for managing an image are provided. As a result, the illustrative embodiments provide a technical effect of reducing the size of images and reducing storage space used to store the images.

As a result, the illustrative embodiments can provide a technical effect of recreating a candidate file from delta data in the new image.

DETAILED DESCRIPTION

Figure 1:
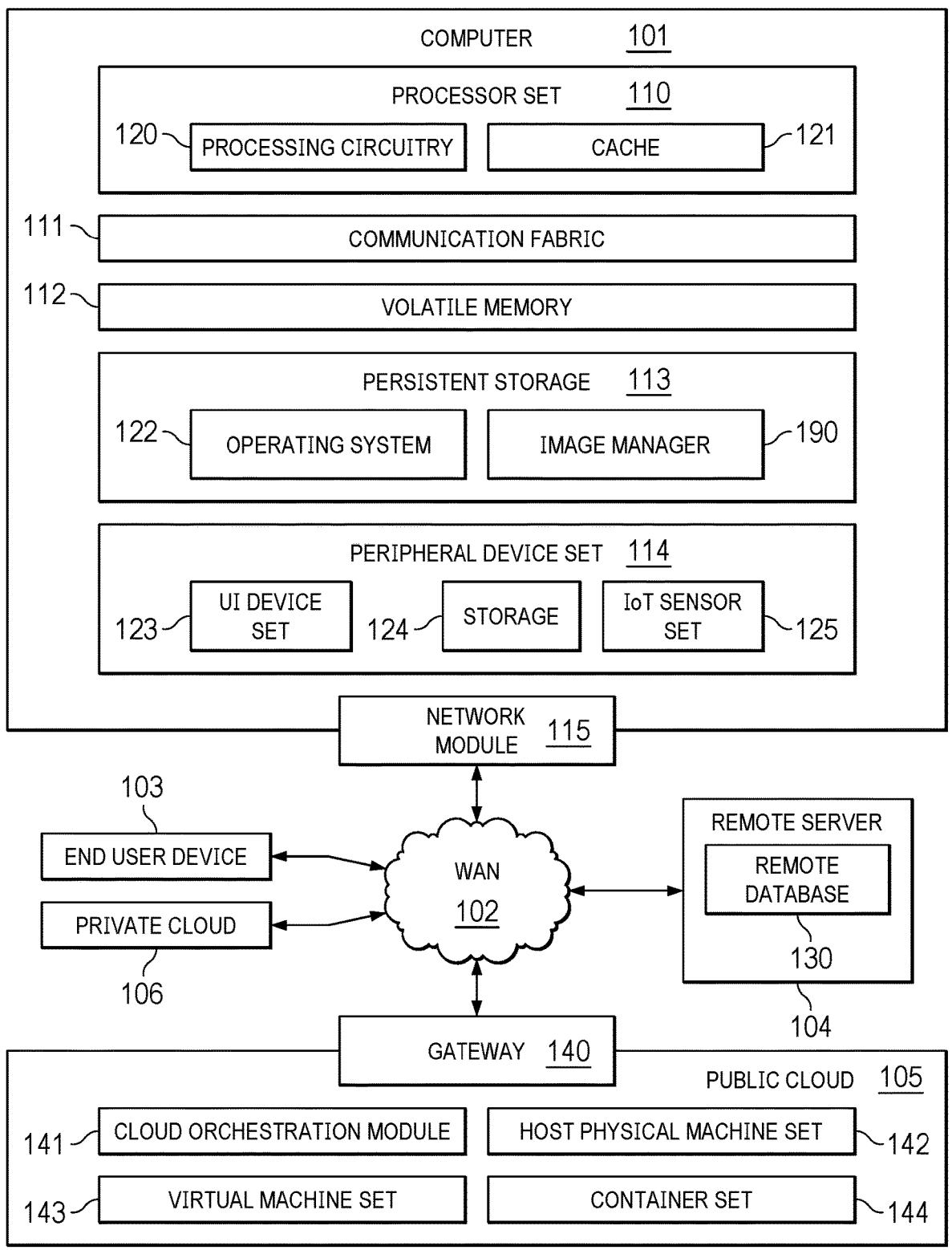
FIG. 1 is a block diagram of a computing environment in accordance with an illustrative embodiment.

A computer implemented method manages an image. A number of processor units identifies a set of base files in a set of image layers for a candidate file in a container layer in response to a request to create a new image with the candidate file. The number of processor units identifies delta data between the candidate file and the set of base files. The number of processor units creates the new image with a new top image layer using the delta data identified for the candidate file in the container layer. As a result, the illustrative embodiments provide a technical effect of reducing the size of images and reducing storage space used to store the images.

As part of identifying, by the number of processor units, the set of base files, the number of processor units adds a set of file names, layer identifiers, and file types for the set of base files to a comparison data structure. As a result, the illustrative embodiments can provide a technical effect of increasing the amount of information used to identify the data to recreate a candidate file.

The number of processor units further updates the comparison data structure with identification of duplicated data between the candidate file and each of the set of base files. As a result, the illustrative embodiments can provide a technical effect of identifying duplicated data between the candidate file and each of the set of base files.

As part of identifying, by the number of processor units, the delta data, the number of processor units identifying duplicated data between the candidate file and the set of base files and creates a delta data map identifying the duplicated data and difference data between the candidate file and the set of base files where the duplicated data in the delta data map for the candidate file and the set of base file comprises a portion of the candidate file not located in the set of base files. Thus, the illustrative embodiments can provide a technical effect of creating a delta data map that can be used to identify delta data for the candidate file.

As part of creating, by the number of processor units, the delta data map, the number of processor units initializes the delta data map; compares the candidate file and a selected base file in the set of base files; and updates the delta data map to reflect duplicated data and difference data between the candidate file and the base file determined from comparing the candidate file to the base file to form an updated delta data map is used as the delta data map for comparing the candidate file to another base file. The number of processor units repeat comparing the candidate file and the base file in the set of base files, updating the updated delta data map for each of the set of base files until the set of process base files have been processed. As a result, the illustrative embodiments can provide a technical effect of creating a delta data map that can be used to reduce a size of a new image.

As part of creating the delta data map, a block by block comparison of first data blocks in the candidate file and second data blocks in the set of base files is performed to identify the duplicated data and the difference data. Thus, the illustrative embodiments can provide a technical effect of creating a delta data map using a block by block comparison.

As part of creating, by the number of processor units, the number of processor units places, by the number of processor units, a comparison data structure in the new top image layer, wherein the comparison data structure identifies the set of base files, the set of image layers in which the set of base files are located, and file types for the set of base files, and duplicated data in the set of base files. The number of processor units place a delta data map in the new top image layer where the delta data map identifies duplicated data between the candidate file and the set of base files in the set of image layers. The number of processor units place the delta data for the candidate file into the new top image layer, wherein the delta data is a portion of the candidate file that is not duplicated in any of the base files. The number of processor units create the new image including the new top image layer comprising the comparison data structure, the delta data map, and the delta data. Thus, the illustrative embodiments can provide a technical effect of creating a new image with reduced size using a comparison data structure, a delta data map, and delta data.

The new top image layer further comprises a comparison data structure identifying duplicated data between the candidate file and the set of base files, a delta data map that identifies the duplicated data and difference data for the candidate file that is not duplicated in the set of the base files. The number of processor units can further create a complete file for the candidate file from the delta data for the candidate file in the new top image layer in new image and the set of base files in the new image. Thus, the illustrative embodiments can provide a technical effect of creating a complete file from a new image with reduced size using delta data for the candidate file in the new top image layer in new image and the set of base files in the new image.

The delta data is included in the new top image layer using at least one of a file containing the delta data, an index node, or a pointer to a file with the delta data. As result, the illustrative embodiments can provide a technical effect of reducing the size of as new image by using delta data in different forms.

A computer system comprises a number of processor units wherein the number of processor units executes program instructions to identify a set of base files in a set of image layers for a candidate file in a container layer in response to a request to create a new image with the candidate file; identify delta data between the candidate file and the set of base files; and create the new image with a new top image layer using the delta data identified for the candidate file in the container layer. As a result, the illustrative embodiments provide a technical effect of reducing the size of images and reducing storage space used to store the images.

As part of identifying the set of base files, the number of processor units further executes the program instructions to add a set of file names, layer identifiers, and file types for the set of base files to a comparison data structure. As a result, the illustrative embodiments can provide a technical effect of increasing the amount of information used to identify the data to recreate a candidate file.

The number of processor units further executes the program instructions to update the comparison data structure with identification of duplicated data between the candidate file and each of the set of base files. As a result, the illustrative embodiments can provide a technical effect of identifying duplicated data between the candidate file and each of the set of base files.

As part of identifying the delta data, the number of processor units further executes the program instructions to identify duplicated data between the candidate file and the set of base files and create a delta data map identifying the duplicated data and difference data between the candidate file and the set of base files, where the duplicated data in the delta data map for the candidate file and the set of base file comprises a portion of the candidate file not located the set of base files. Thus, the illustrative embodiments can provide a technical effect of creating a delta data map that can be used to identify delta data for the candidate file.

As part of creating the delta data map, the number of processor units further executes the program instructions to initialize the delta data map; compare the candidate file and a selected base file in the set of base files; update the delta data map to reflect duplicated data and difference data between the candidate file and the base file determined from comparing the candidate file to the base file to form an updated delta data map is used as the delta data map for comparing the candidate file to another base file; and repeat comparing the candidate file and the base file in the set of base files, updating the updated delta data map for each of the set of base files until the set of process base files have been processed. As a result, the illustrative embodiments can provide a technical effect of creating a delta data map that can be used to reduce a size of a new image.

A block by block comparison of first data blocks in the candidate file and second data blocks in the set of base files is performed to identify the duplicated data and the difference data. Thus, the illustrative embodiments can provide a technical effect of creating a delta data map using a block by block comparison.

As part of creating the new image, the number of processor units further executes the program instructions to place a comparison data structure in the new top image layer, wherein the comparison data structure identifies the set of base files, the set of image layers in which the set of base files are located, and file types for the set of base files, and duplicated data in the set of base files; place a delta data map in the new top image layer, wherein the delta data map identifies duplicated data between the candidate file and the set of base files in the set of image layers; place the delta data for the candidate file into the new top image layer, wherein the delta data is a portion of the candidate file that is not duplicated in any of the base files; and create the new image including the new top image layer comprising the comparison data structure, the delta data map, and the delta data. Thus, the illustrative embodiments can provide a technical effect of creating a new image with reduced size using a comparison data structure, a delta data map, and delta data.

The new top image layer further comprises a comparison data structure identifying duplicated data between the candidate file and the set of base files, a delta data map that identifies the duplicated data and difference data for the candidate file that is not duplicated in the set of the base files and the number of processor units further executes the program instructions to create a complete file for the candidate file from the delta data for the candidate file in the new top image layer in new image and the set of base files in the new image. Thus, the illustrative embodiments can provide a technical effect of creating a complete file from a new image with reduced size using delta data for the candidate file in the new top image layer in new image and the set of base files in the new image.

The delta data is included in the new top image layer using at least one of a file containing the delta data, an index node, or a pointer to a file with the delta data. As result, the illustrative embodiments can provide a technical effect of reducing the size of as new image by using delta data in different forms.

A computer program product for managing an image, the computer program product comprises a computer readable storage medium having program instructions embodied therewith. The program instructions are executable by a computer system to cause the computer system to identify a set of base files in a set of image layers for a candidate file in a container layer in response to a request to create a new image with the candidate file; identify delta data between the candidate file and the set of base files; and create the new image with a new top image layer using the delta data identified for the candidate file in the container layer. As a result, the illustrative embodiments provide a technical effect of reducing the size of images and reducing storage space used to store the images.

The new top image layer further comprises a comparison data structure identifying duplicated data between the candidate file and the set of base files, a delta data map that identifies the duplicated data and difference data for the candidate file that is not duplicated in the set of the base files. The program instructions are executable by a computer system to cause the computer system to create a complete file for the candidate file from the delta data for the candidate file in the new top image layer in new image and the set of base files in the new image. As a result, the illustrative embodiments can provide a technical effect of creating a complete file from a new image with reduced size using delta data for the candidate file in the new top image layer in new image and the set of base files in the new image.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as image manager 190 to provide increased efficiency in managing and storing images comprised of layers. Image manager 190 can operate to more efficiently store images for containers in a manner that reduces the use of storage resources. In addition to image manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and image manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in image manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in image manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative examples recognize and take into account a number of different considerations as described herein. For example, many platforms that are Platform as a Service (PaaS) systems use images that are read-only and that cannot be changed. Examples of some systems include Docker and Kubernetes.

These types of images are comprised of multiple layers, which are overlaid on each other. Each layer represents a modification such as a deletion or addition of a file to a base image. The layers in images can be read-only and unchangeable.

In other words, once a layer is added to an image, that image layer cannot be modified. For example, image layer 1 is the lowest layer in the image and image layer 2 is located on top of image layer 1 in the image.

When a container is created from an image, the container is referred to as the container layer. This container layer is at the top of the image layers in the image. The container layer can be committed to form a new top image layer for the image. The container layer is read-write while all the image layers are read only.

Adding new images layers to the image increases the amount of storage needed for the image. For example, an image initially contains only image layer 1 that includes File A. Next, a container layer is created from the image. File A is deleted from the container layer. File A cannot be removed from image layer 1. Instead, a deletion marker such as a "whiteout" file (.wh_A) is created in the container layer, to simulate the removal. A "whiteout" file is an implementation of a deletion marker used in Docker containers.

The container layer into a new top image layer as image layer 2 including a .wh_A. Another container layer can be created from image layer 2 in which a new version of File A is added to the container layer. This container layer can be used to create a new top image layer as layer 3 including a new version of file-A.

As an image is continually and broadly distributed and used in cloud environments, more layers are often to the image. For example, File A can be deleted again in layer K, and re-added with a new version of File A in in layer M.

One issue with deleting and re-adding files is that the different files are stored in the lower layers even though those files have no use in a container created using the image. In this example, the image stores three full copies of File A. One copy is stored in image layer 1, another copy in image layer 3, a third copy is stored in image layer M. The two files in image layer 3 and image layer M can be different versions of File A in image layer 1. These files have largely duplicated portions because they are different versions of each other. In other words, the differences between the different versions may be small. As a result, many largely duplicated copies of multiple files are stored in different image layers of an image.

Thus, the illustrative examples provide a computer implemented method, apparatus, system, and computer program product for managing images for containers. The image for the container can be managed to avoid redundant content between a re-added file from the top layer and the deleted copies from the lower image layers.

In the illustrative examples, recreated copies of the same file in different image layers can be compared to identify differences between the files. In these examples, later layers only store the changes from the original copy of the file. In other words, delta data is stored in subsequent layers when an original file is replaced with a modified version of that original file. As a result, the final view of the image can contain the updated file using the delta data and reduce the amount of storage needed as compared to current techniques that store complete copies of files that may only have slight changes with other versions of files in the image.

For example, for a file that is re-added in the container layer after being deleted in the image layers, data can be deduplicating between the copy in container layer and the copies in image layers. In filesystem, the data in a file is stored in multiple data blocks. After a file (e.g., File A) is added in the container layer, in the post-file-creation-stage, a search is performed for any corresponding whiteout file (ex: .wh_A) in the image layers. If a whiteout file is found, File A is marked as a candidate for processing in later pre-commit-stage.

When the container layer is committed as a new top image layer, a pre-commit-state occurs in which a candidate file in the container layer is compared with the copies in the image layers. Example, the comparison can be performed on a block by block basis. If a block is duplicated with that of an image layer, that block is deleted in the container layer. After the comparison, the remaining blocks of a re-added file in the container layer are unique blocks. In other words, these blocks have no duplicated blocks in the image layers. These blocks are delta data and can also be referred to as "delta blocks".

For a re-added file, only the delta blocks are committed into the new top image layer. As result, the amount of storage space used to store each copy of a re-added file that was deleted in lower image layers can be reduced.

As a result, the illustrative examples can control the creation of layers for an image in a manner that reduces or avoids redundant content being present between different layers in the image. The illustrative example can be especially useful in images that have a re-created copy of the file and deleted copies in lower layers that are read-only layers in the image.

Figure 2:
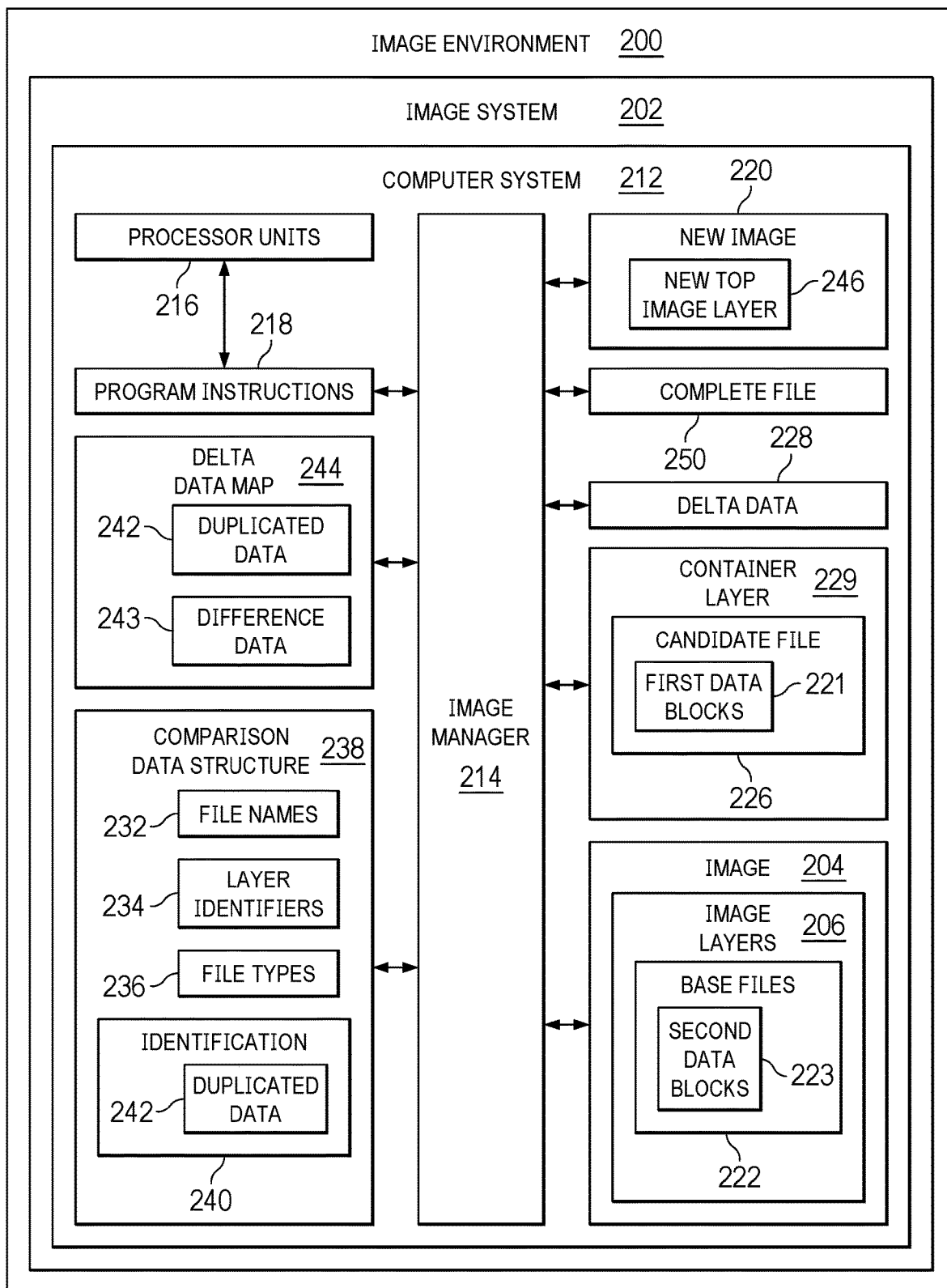
FIG. 2 is a block diagram of an image environment in accordance with an illustrative embodiment.

With reference now to FIG. 2, a block diagram of an image environment is depicted in accordance with an illustrative embodiment. In this illustrative example, image environment 200 includes components that can be implemented in hardware such as the hardware shown in computing environment 100 in FIG. 1.

This illustrative example, image system 202 in image environment 200 can manage image 204. This management includes activities such as the creation, modification, distribution, and other activities with respect to image 204. In this illustrative example, image 204 is a read-only image comprising image layers 206 that cannot be changed.

Image system 202 includes a number of different components that operate to manage image 204. As depicted, image system 202 comprises computer system 212 and image manager 214. Image manager 214 is located in computer system 212.

Image manager 214 can be implemented in software, hardware, firmware, or a combination thereof. When software is used, the operations performed by image manager 214 can be implemented in program instructions configured to run on hardware, such as a processor unit. When firmware is used, the operations performed by image manager 214 can be implemented in program instructions and data and stored in persistent memory to run on a processor unit. When hardware is employed, the hardware can include circuits that operate to perform the operations in image manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

Image manager 214 can perform different steps in managing image 204. For example, image manager 214 can create new image 220 from image 204 including candidate file 226 in container layer 229. In this illustrative example, container layer 229 is a read/write layer and is generated when running a container using image 204. In this example, candidate file 226 contains all of the data needed to run candidate file 226. In other words, candidate file 226 in container layer 229 is complete file. This data can be program instructions, values, parameters, configuration information, or other types of data.

In one illustrative example, image manager 214 identifies a set of base files 222 in a set of image layers 206 for candidate file 226 in a container layer 229 in response to a request to create new image 220 with candidate file 226.

As used herein, a "set of" when used with reference items means one or more items. For example, a set of base files 222 is one or more of base files 222.

In this illustrative example, candidate file 226 is a version of the set of base files 222 in image manager 214. For example, candidate file 226 can be a newer version or the same version as one or more of the set of base files 222 and image layers 206. Candidate file 226 can be identified as version of the set of base files 222 in a number of different ways. For example, when image 204 is a document, the absolute path and filename can be used to determine whether two files are versions of each other. For example, candidate file 226 is a version of a base file in the set of base files 222 if both candidate file and set a base files have the same absolute path and filename. For example, in "/a/b/c/file1", "/a/b/c/" is the absolute path and "file1" is the filename. If two files in different layers in a Docker image are both identified as "/a/b/c/file1", they are both versions of each other.

In this illustrative example, image manager 214 identifies delta data 228 between candidate file 226 and the set of base files 222. Image manager 214 creates new image 220 with new top image layer 246 using delta data 228 identified for candidate file 226 in container layer 229.

In identifying the set of base files 222, image manager 214 examines image layers 206 for the set of base files 222. Image manager 214 can add a set of file names 232, layer identifiers 234, and file types 236 for the set of base files 222 to comparison data structure 238. In this example, file names 232 are the names of the set of base files 222. Layer identifiers 234 identifies image layers 206 in which each of the set of base files 222 are located. File types 236 identifies whether a base file is a full file or a delta file. A full file contains all of the data or information for the base file. A delta file indicates that the base file only includes a portion of the information for the file. Further, image manager 214 can update comparison data structure 238 with identification 240 of duplicated data 242 between candidate file 226 and the set of base files 222.

In this illustrative example, the image manager 214 can identify delta data 228 by identifying duplicated data 242 between candidate file 226 and the set of base files 222. Image manager creates delta data map 244 identifying duplicated data 242. The delta map can also identify difference data 243 between candidate file 226 and the set of base files 222.

Difference data 243 in a delta data map 244 for candidate file 226 and the set of base files 222 identifies a portion of candidate file 226 not located the set of base files 222. In the illustrative example, a block by block comparison of first data blocks 221 in candidate file 226 and second data blocks 223 in set of base files 222 can be performed to identify the duplicated data 242 and difference data 243.

Image manager 214 can create delta data map 244 by initializing the delta data map 244. The initialization can set all of the values in delta data map 244 to a null value, zero, or some other value that can be changed as comparisons are made.

In this example, image manager 214 compares candidate file 226 and a selected base file in the set of base files 222. From this comparison, image manager 214 updates delta data map 244 to reflect duplicated data 242 and difference data 243 between candidate file 226 and base file determined from comparing candidate file 226 to the base file to form an updated delta data map that is used as delta data map 244 for comparing candidate file 226 to another base file. Image manager 214 repeats comparing candidate file 226 and the base file in set of base files 222, updating delta data map 244 for each of the set of base files until the set of process base files have been processed.

In creating new image 220, image manager 214 places comparison data structure 238 in new top image layer 246. Comparison data structure 238 includes file names 232 that identifies the set of base files 222, layer identifiers 234 that identify the set of image layers 206 in which the set of base files 222 are located, and the file types 236 for the set of base files, and duplicated data 242 in the set of base files 222. Image manager 214 places delta data map 244 in new top image layer 246. In this example, delta data map 244 identifies duplicated data 242 between candidate file 226 and the set of base files 222 in the set of image layers 206.

Additionally in this example, image manager 214 also places delta data 228 for candidate file 226 into new top image layer 246. In this depicted example, delta data 228 is a portion of candidate file 226 that is not duplicated in any of the set of base files 222. Image manager 214 creates new image 220 including new top image layer 246 comprising comparison data structure 238, delta data map 244, and delta data 228. In this example, new image 220 is a copy of image 204 with the addition of new top image layer 246 containing candidate file 226.

With new image 220, image manager 214 can create complete file 250 for candidate file 226 from delta data 228 for candidate file 226 in new top image layer 246 and the set of base files 222 in new image 220.

In one illustrative example, one or more technical solutions are present that overcome a problem with the size of images increasing as changes are made to the images. As a result, one or more solutions provide an effect of reducing the size of images occurring in response to modifications of images. In one illustrative example, delta data for versions of the same file can be used rather than storing complete files for each version in the different layers. With this example, a complete file can be saved the first time a file is used in the image. When the file is removed and re-added using versions of the file, those versions are stored using delta data rather than complete files in the image layers.

As a result, image sizes are reduced. This reduction of image sizes results in less storage being needed for images. Additionally, with the reduction in the sizes, less bandwidth is needed to transfer images when used to create containers or for other uses. Thus, the different illustrative examples can reduce resource usage and a computer system such as computer system 212.

Computer system 212 can be configured to perform at least one of the steps, operations, or actions described in the different illustrative examples using software, hardware, firmware, or a combination thereof. As a result, computer system 212 operates as a special purpose computer system in which image manager 214 in computer system 212 enables modifying an image using delta data rather than complete files when versions of the files are added and removed from the image. In particular, image manager 214 transforms computer system 212 into a special purpose computer system as compared to currently available general computer systems that do not have image manager 214.

In the illustrative example, the use of image manager 214 in computer system 212 integrates processes into a practical application for managing images that increases the performance of computer system 212. In other words, image manager 214 in computer system 212 is directed to a practical application of processes integrated into image manager 214 in computer system 212 that modified can an image to add a version of a prior file or files in the image. The prior file or files are a set of base files. The file to be added is a candidate file in these examples. In this illustrative example, image manager 214 in computer system 212 stores delta data for candidate file in the image in a new image layer rather than a complete file in the new image layer. As result, the image size is reduced as compared to current techniques for storing versions of files in images. This reduction in size reduces at least one of storage space needed to store images in computer system 212 or bandwidth used by computer system 212 to transmit images.

The illustration of image environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figures 3, 4:
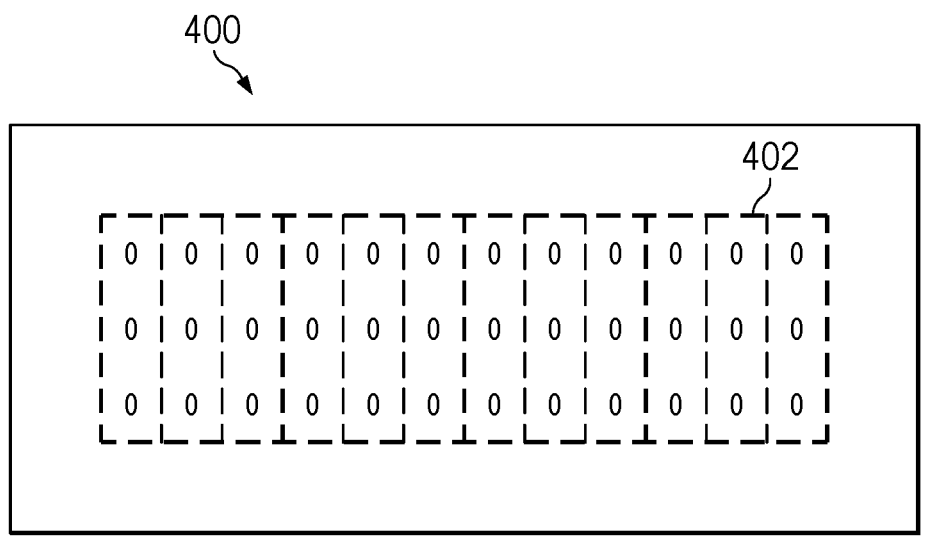
FIG. 3 is a diagram of a comparison data structure in accordance with an illustrative embodiment.
FIG. 4 is a diagram of a delta data map in accordance with an illustrative embodiment.

Turning next to FIG. 3, a diagram of a comparison data structure is depicted in accordance with an illustrative embodiment. In this illustrative example, comparison data structure 300 is an example of one implementation for comparison data structure 2xx in FIG. 2. In this example, comparison data structure 300 can be a layers of previous copy with comparison data structure used to store information about candidate files that identified as possibly being re-added files in an image.

As depicted, comparison data structure 300 includes columns that include file name 302, previous copy layer 304, file type 306, and same data range 308. In this example, file name 302 is the name of the candidate file that has been re-added to the image. Previous copy layer 304 identifies a layer in the image in which a base file is present. The base file is a file from which the candidate file can be derived. The candidate file can be a copy, or a version of the base file identified in the previous layer. File type 306 indicates the type of file in the image layer. In this example, same data range 308 identifies the same data that is present between the candidate File A and the prior File A in layer 1.

For example, row 312 indicates that File A is in layer 1 of the image. In this example, File A is a full or complete copy of the file. The same data range is found in a data structure R1. This data structure R1 identifies data blocks that are the same between File A in layer 1 in the candidate file being processed.

As another example, in row 310, File A is found in layer 3 with a file type delta. The delta file type indicates that File A in layer 3 is a portion of the file that is unique as compared to File A in a lower image layer, layer 1, in the image. R3 is the name of the data structure that contains the identification of data blocks that are the same between File A in layer 3 and the candidate file.

Turning next to FIG. 4, a diagram of a delta data map is depicted in accordance with an illustrative embodiment. Delta data map 400 is in the form of file block bit map 402. File block bit map 402 for delta data map 400 takes is an example of delta data map 244 in FIG. 2 and identifies the portions of the candidate file that are the same as a prior base file in the portions of the code file that are different from the prior base file. In this illustrative example, the delta map is a file block bitmap in which a "0" indicates that the two corresponding data blocks between the base file and the candidate file are the same. Further, a "1" indicates that the corresponding data blocks between the base file in the candidate file are different from each other.

Delta data map 400 can be implemented in other forms in other illustrative examples. For example, records with fields can be used for delta data map 400 in another example.

Figure 5:
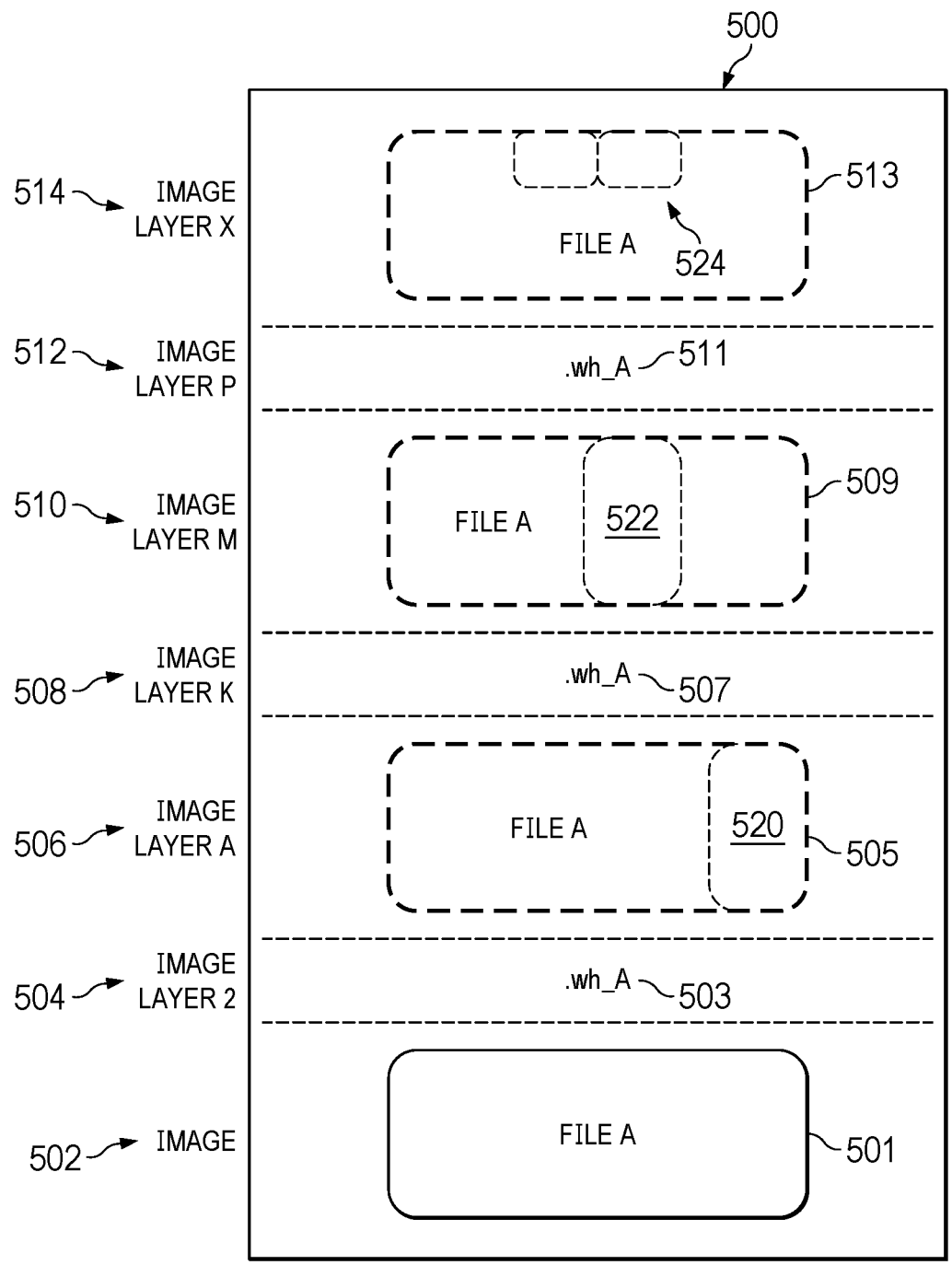
FIG. 5 is a diagram of a Docker image in accordance with an illustrative embodiment.

Turning next to FIG. 5, a diagram of a Docker image is depicted in accordance with an illustrative embodiment. In this illustrative example, docker image 500 is an example of one type of image that can be used for image 204 in FIG. 2. In the illustrative examples, a file illustrated using dashed lines that the file contains delta data rather than containing all the data for the file. In these examples, a file depicted using a solid line indicates that the file contains all of the data.

In this example, docker image 500 has image layer 1 502, image layer 2 504, image layer A 506, image layer K 508, image layer M 510, image layer P 512, and image layer X 514. As depicted in this example, docker image 500 is space efficient because delta data is stored for base files in in the image layers in docker image 500 rather than storing an entire file in all of the image layers in docker image 500.

As depicted in this example, image layer 1 502 includes File A 501. In this example, File A 501 is an entire file and contains all of the data for this file. Image layer 504 contains a deletion marker in the form of whiteout file 503. This whiteout file indicates that File A 501 was deleted in image layer 2 504.

In image layer A 504, File A 505 was re-added to docker image 500. File A 505 is not a complete file but comprises delta data 520 rather than being an entirely new copy. Delta data 520 comprises data blocks in File A 505 that are different from the data blocks in File A in image layer 1 502. Image layer K 508 has whiteout file 507 that removes File A 505 in image layer A 506. In image layer M 510. File A 509 was re-added to docker image 500 in image layer M 510. As depicted, File A 509 comprises delta data 522 rather than the entire file. Delta data 522 comprises the data blocks that are different from File A 501 in image layer 1 502.

In image layer P 512, whiteout file 511 removes File A 509. X 514 re-adds File A 513 has been re-added to docker image 500. This image layer is the top image layer in this example. As depicted, File A 513 comprises delta data 524. Delta data 520 is the difference or delta between File A 509 and File A 505, and File A 501. File A 513 can be re-created using difference data for File A and identify the same data in prior versions of File A 513. Thus, docker image 500 takes up less space than currently used docker image files in which a full copy of the files is present for re-added files in different image layers.

Figure 6:
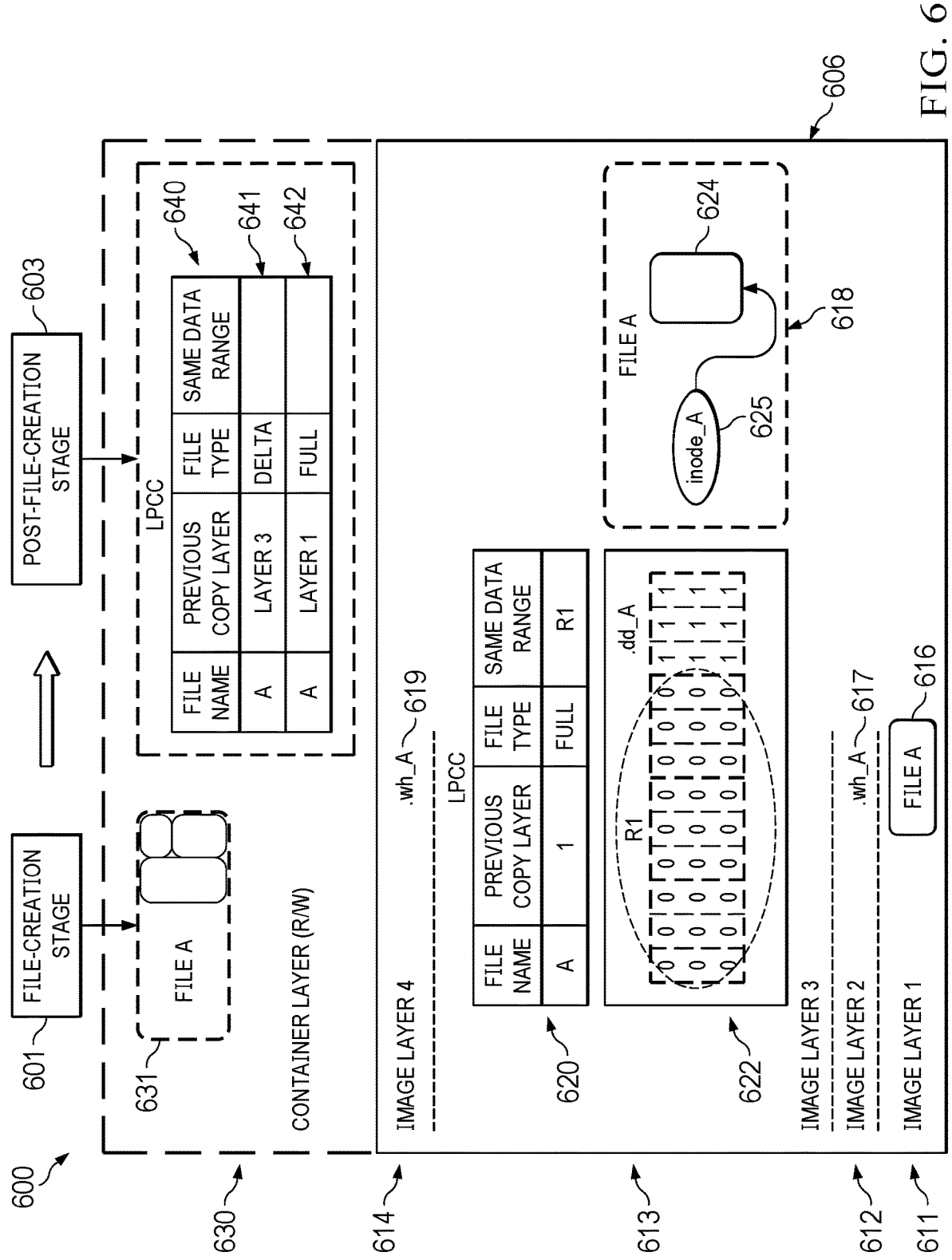
FIGS. 6 and 7 are diagrams illustrating data flow for creating a new image adding a candidate file in accordance with an illustrative embodiment.
Figure 7:
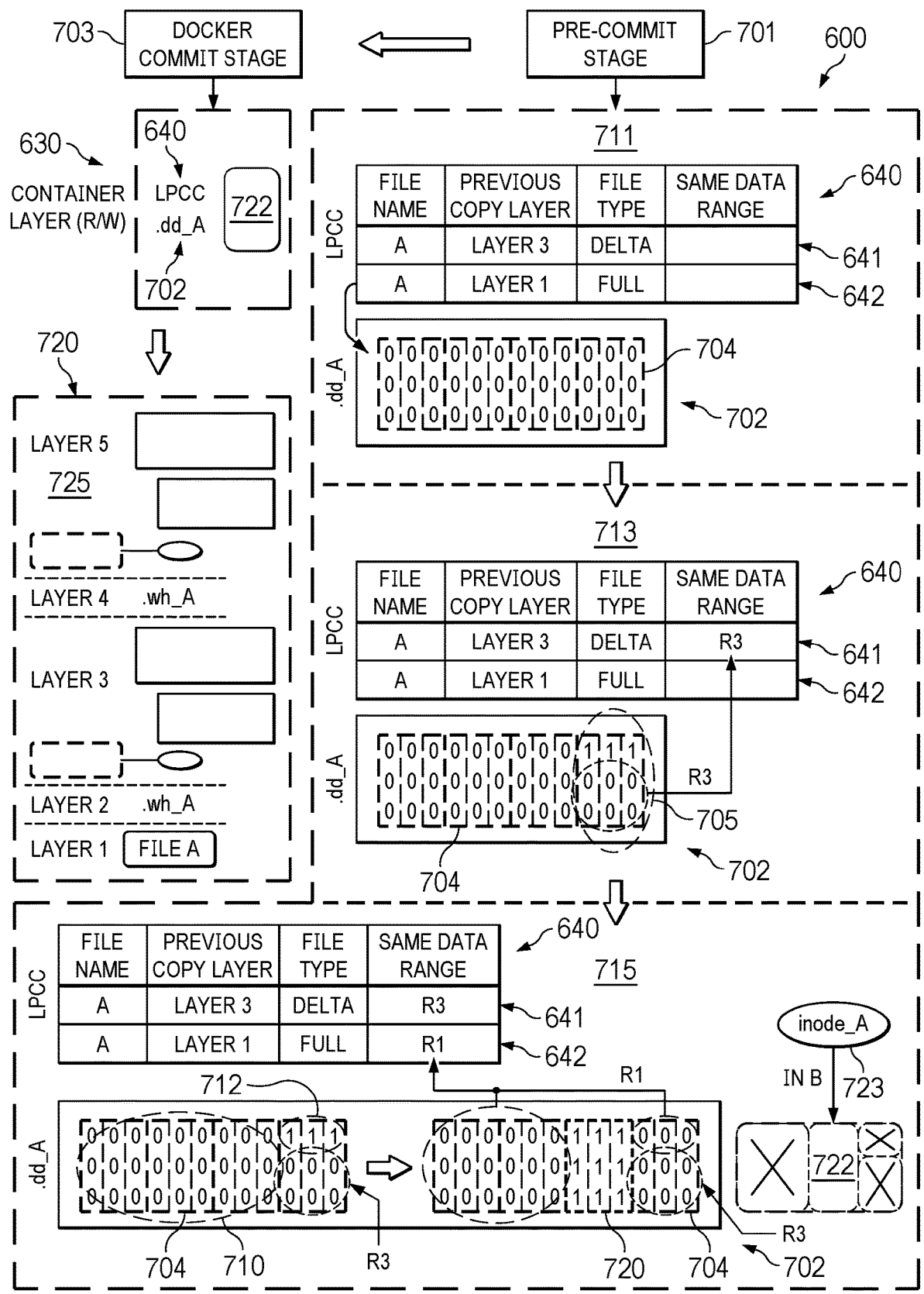

With reference to FIGS. 6 and 7, diagrams illustrating data flow for creating a new image adding a candidate file are depicted in accordance with an illustrative embodiment. This process can be implemented using image manager 214 in computer system 212 in FIG. 2. As depicted, data flow 600 includes file creation stage 601, post-file creation stage 603, pre-commit stage 701, and docker commit stage 703.

In file creation stage 601, image 606 comprises four image layers, image layer 1 611, image layer 2 612, image layer 3 613, and image layer 4 614. File A 616 is located in image layer 1 611; whiteout file 617 is located in image layer 2 612. Whiteout file 617 is named ".wh_A" in this example.

As depicted, File A 618 is located in image layer 3 613. In this example, layer 3 613 also includes layers of previous copy with comparison (LPCC) data structure 620 and delta data map 622. In this example, LPCC data structure 620 is an example of comparison data structure 238 in FIG. 2. File A 618 comprises delta data 624. Delta data 624 can be placed in image layer 4 614 through the use of Inode 625. Inode 625 is also referred to as an index node and is a data structure used to store information about a file or directory. In this example, inode 625 can include metadata providing information about the file, permissions, size, ownership, and including the location of actual data blocks that make up delta data 624.

As depicted, image layer 4 614 includes whiteout file 619, which is also named ".wh_A". Further in this example, container layer 630 has read and write access. In this example, in file creation stage 601, File A 631 has been added to container layer 630 and is a version of File A 616 and File A 618. File A 631 is an example of candidate file 226 in FIG. 2. File A 616 and File A 618 are examples of a set of base files 222 in FIG. 2.

In this example, post-file creation stage 603 can be initiated in response to a user request to create a new image from container layer 630. The process searches the image layers for a whiteout file corresponding to File A 631. In this example, whiteout file 619 in image layer 614 is located and indicates that File A 618 in image layer 3 613 was deleted or removed.

In post-file creation stage 603, LPCC data structure 640 initialized in container layer 630. In this example, LPCC data structure 640 is created in container data structure 630 in response to locating whiteout file 619. This data structure is also an example of an implementation for comparison data structure 238 in FIG. 2. As depicted, in section 711, row 641 identifies information about File A 616 in image layer 1 611.

The file name, previous copy layer, and file type for File A 616 in row 642 can be obtained from LPCC data structure 620. The information in row 642 of LPCC data structure 640 can be obtained from locating and analyzing File A 618.

In this example, pre-commit stage 701 in data flow 600 releases duplicated data and only keeps delta data in container layer 630. This process involves using LPCC data structure 620 and delta data map 702.

Delta data map 702 is created in pre-commit stage 701. In this example, delta data map 702 is a different map from delta data map 622. File A block map 704 for delta data map 702 has been initialized with "0" that can be overridden and updated as comparisons of file a 631 are made with File A 618 and File A 616.

In section 713 in pre-commit stage 701, a determination of the differential between File A 631 and File A 618 is made. In other words, the data in File A 631 and File A 618 are compared with each other to determine what data is duplicated and what data is different between these two files. As depicted, delta data map 702 has been updated in section 705 to indicate which blocks are the same in which blocks are different between these files. In this example, the same data range is shown in R3, which is saved in the same data range in row 641. As depicted, section 705 is updated using "0" for data that is the same or duplicated and "1" for data that is different. As depicted, R is placed into row 641.

Next in section 715 of pre-commit stage 701, a difference between File A 631 and File A 611 is determined for section 710 and section 712. A comparison for R3 is not needed in this example because a determination was made that R3 had the same data from the prior comparison of File A 631 with file a 618.

From comparing File A 631 with File A 616, section 720 is identified as having different data, and the values are set to "1". This section of the map identifies the delta data for File A 631. Section 710 and section 712 have the same data in the comparison and the bits are set to "0" in this section. The values in section 712 were set to "1" from the comparison with File A 618. However, with this comparison, the values in section 712 are set to "0" because those sections have the same data from the comparison with File A 616 even though section 712 was different in the comparison with File A 618. These sections form R1 for the same data range in row 642. The same data ranges R1 and R3 can be used along with the delta data to re-create the whole file for File A 631. In this example, R1 and R3 can be used to identify data in File A 616 and File A 618 that can be obtained and used with the delta data for File A 631 to re-create a whole complete file.

With the completion of the comparisons and updating delta data map 702 and LPCC data structure 640, the process shifts to docker commit stage 703. In this stage, LPCC data structure 640, delta data map 702, and delta data 722. In this stage, container layer 630 can be committed to form new image 720. In which container layer 630 becomes layer 5

725 is a new top layer for new image 720. In this example, the layers below layer 5 725 are in the same layers from image 606.

Figure 8:
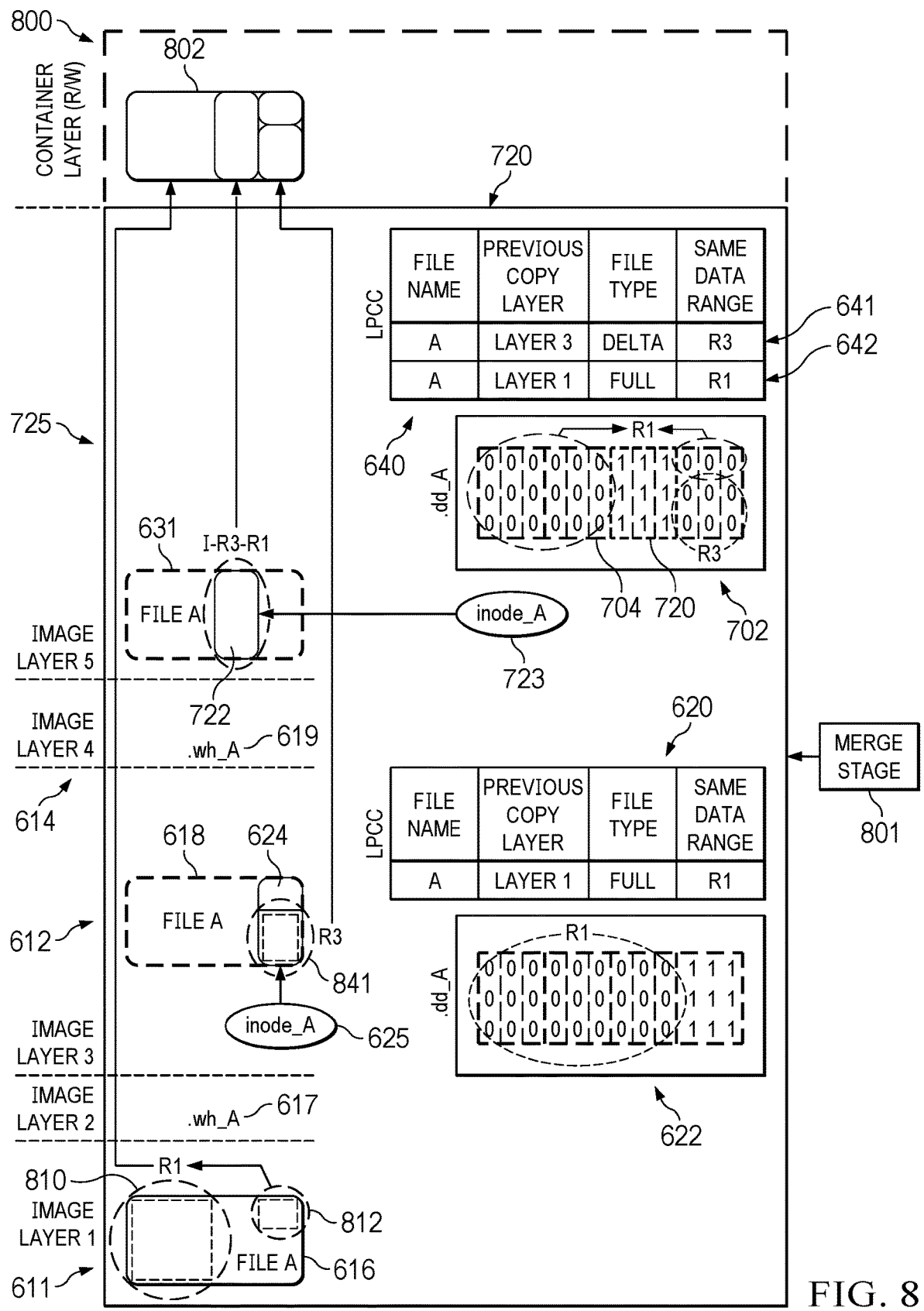
FIG. 8 is a diagram illustrating file creation using an image in accordance with an illustrative embodiment.

Next FIG. 8, a diagram illustrating file creation using an image is depicted in accordance with an illustrative embodiment. This process can be implemented using image manager 214 in computer system 212 in FIG. 2.

In merge stage 801, new image 720 is used to create container layer 800. The delta data found in different image layers in new image 720 can be merged using delta data map 702 and LPCC data structure 640 to form a complete file, File A 902.

As depicted, data from different versions of File A in new image 720 to create File A 802 as complete file. As depicted, a dashed line around a version of File A indicates that the file is stored using delta data and not the entire file within new image 720. A solid line around a version of File A indicates that that File A is stored as an entire or whole file. For example, File A 616 is stored as complete file; File A 618 is stored using delta data 624, and File A 631 is stored using delta data 722.

This example, delta data 722 is pointed by Inode 723. Inode 723 points to the difference data identified by "1s" in delta data map 702. This difference data is delta data 722 4 File A 631. Other data is duplicated and not stored for File A 631 in new image layer 5 725.

As depicted, File A 802 can be created using delta data 722 in File A 631 and sections of data from File A 616 and File A 618. In this illustrative example, duplicated data from these two files can be used to create complete file for File A 802. The identification of the duplicate data to be used from File A 616 and File A 618 can be identified using LPCC data structure 640 and delta data map 702. LPCC data structure 640 identifies same data ranges as R1 for File A 616 and R3 for File A 618. These data ranges can be used with delta data map 702 identify sections of data to be retrieved from File A 616 and File A 618 in creating File A 802. R1 and R3 correspond to locations in delta data map 702. As result, delta data map 702 can be used to identify the duplicate data in File A 616 and File A 618 that is a duplicate of data in File 631. R3 and R1 for same data range in LPCC data structure 640 is used to identify which portions of data should be retrieved from File A 616 and File A 618 to form File A 802 in container layer 800.

For example, R1 indicates section 810 and section 812 contain duplicate data that is used to form the corresponding sections in File A 802. Section 814 in File A 618 includes different data that is used to create File A 802.

In creating File A 802, data in File A 616 identified using R1 is loaded into container layer 800. Data in delta data 618 identified using R3 is loaded into container layer 800. Delta data 722 is loaded into container layer 800. The loading of this data results in File A 802. Thus, File A 802 can be created in container layer 800 using delta data from the different image layers in new image 720 rather than needing a complete copy of File A 802 in image layer 5 725.

With this ability to create file A 802 from delta data rather than needing entire files in every image layer, size of new image 720 can be reduced as compared to current techniques for storing files in images.

In other illustrative examples, File A 802 can also be created for other types of access such as viewing File A 608. With this example, File A 802 is created in the same manner but stored in a read-only form in memory for viewing rather than in container layer 800.

Figure 9:
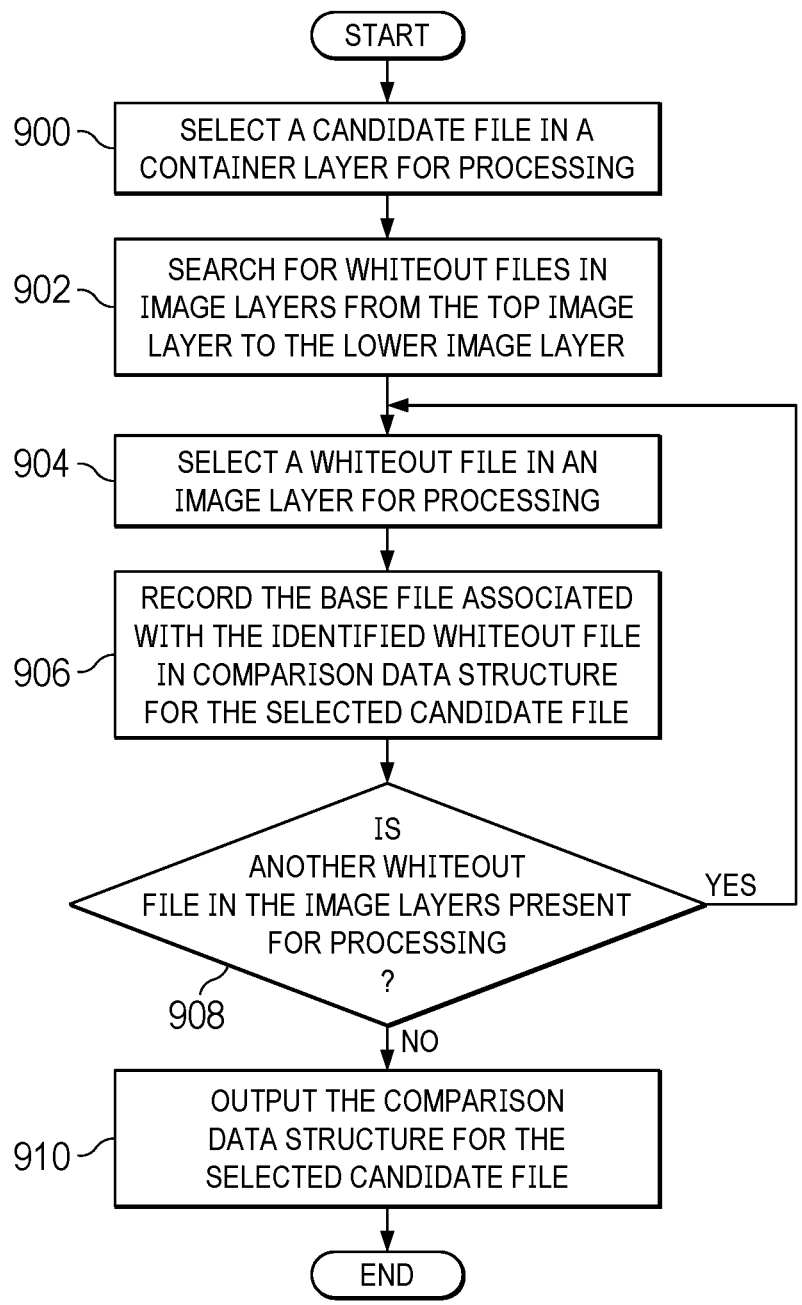
FIG. 9 is a flowchart of a process for creating comparison data structure for a candidate file in accordance with an illustrative embodiment.

In FIG. 9, a flowchart of a process for creating comparison data structure for a candidate file is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in image manager 214 in computer system 212 in FIG. 2. The process in FIG. 9 is an example of steps that can be used in an implementation for post-file creation stage 603 in FIG. 6.

The process selects a whiteout file in an image layer for processing (step 904). The process records the base file associated with the identified whiteout file in comparison data structure for the selected candidate file (step 906). In step 906, each row in the comparison data structure includes information for the base file identified by a whiteout file. For example, comparison data structure can include columns for file name, previous copy layer, file type, and same data range.

As depicted, the file name is the name of the base file. Previous copy layer is layer in the image in which the base file associated with the whiteout file is located. File type indicates the type of file in the image layer. For example, file type can be "delta" or "full". "Delta" type indicates that the file for the selected candidate file in an image layer is a delta data file, and "full" type indicates that the file for the selected candidate file in an image layer is a full file. Further, columns for the same data ranges identify the same data that is present between the base files for the selected candidate file in different image layers. In this step, columns for the same data ranges are left blank for further processing.

The process determines whether another whiteout file in the image layers is present for processing (step 908). If not all whiteout files in the image layers have been selected for processing, the process returns to step 904 and repeats step 904 to step 908 until all whiteout files in the image layers have been selected for processing. On the other hand, if all whiteout files in the image layers have been selected for processing, the process outputs the comparison data structure for the selected candidate file (step 910). The process terminates thereafter.

In this illustrative example, step 908 is an optional determination. Once a base file is found, the comparison data structure for that base file can be used to obtain information from the remaining records for additional base files in lower image layers. The information that can be used from this comparison data structure for the base file includes file name, previous copy layer, and file type. The same data ranges used in comparison data structure being created are different based on the comparison of the candidate file with the set of phase files.

Figure 10:
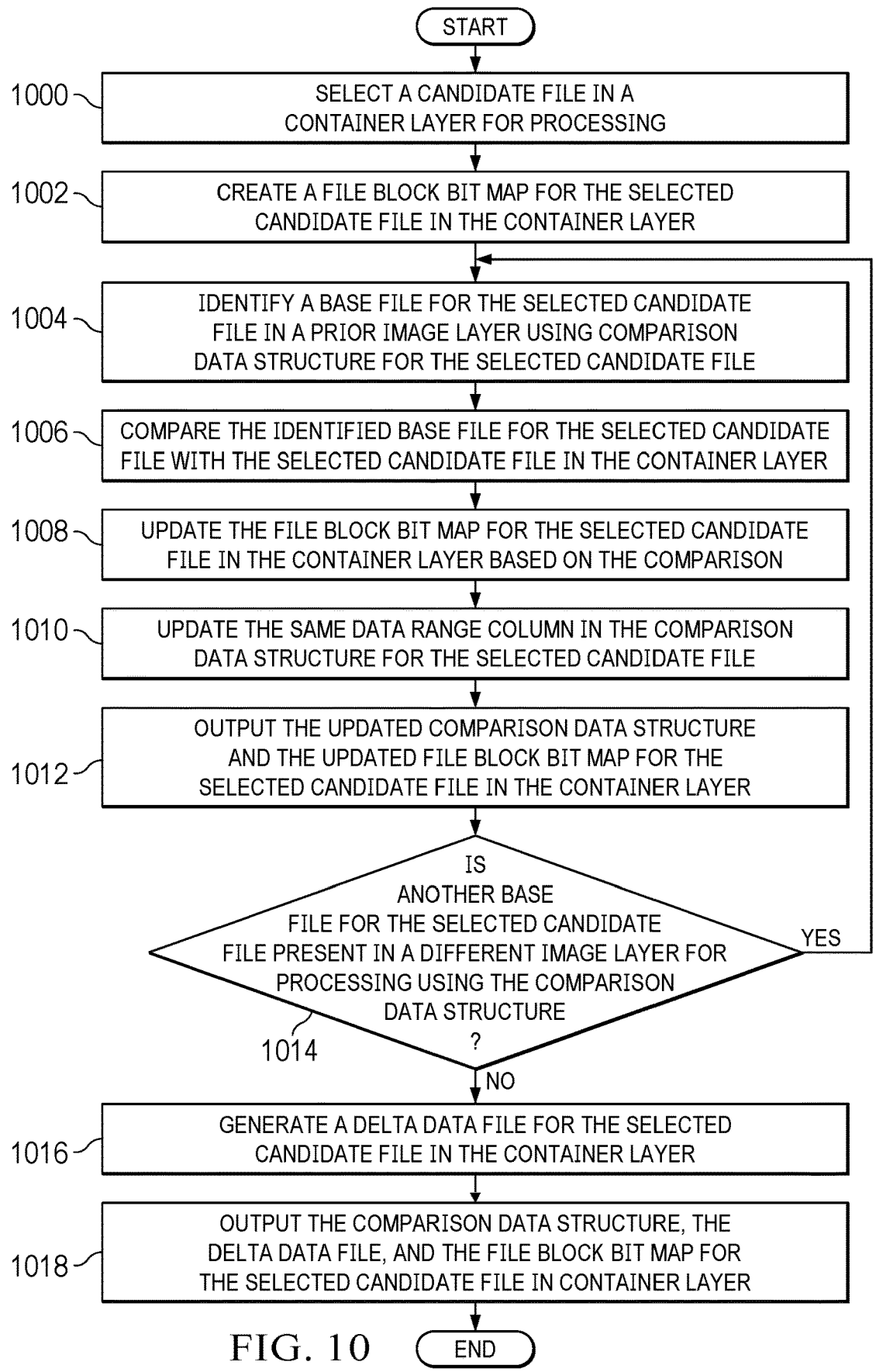
FIG. 10 is a flowchart of a process for identifying differences between files in different image layers in accordance with an illustrative embodiment.

Turning next to FIG. 10, a flowchart of a process for identifying differences between files in different image layers is depicted in accordance with an illustrative embodiment. The process in FIG. 10 can be implemented in hardware, software, or both. When implemented in software, the process can take the form of program instructions that are run by one of more processor units located in one or more hardware devices in one or more computer systems. For example, the process can be implemented in image manager 214 in computer system 212 in FIG. 2. The process in FIG. 10 is an example of steps that can be used in an implementation for pre-commit stage 701 in FIG. 8.

The process begins by selecting a candidate file in a container layer for processing (step 1000). The process creates a file block bit map for the selected candidate file in the container layer (step 1002). In this illustrative example, the file block bit map forms the delta data map and identifies portions of the selected candidate file that are the same as a base file for the selected candidate file in previous image layer, and portions of the selected candidate file that are different from the base file for the selected candidate file in previous image layer.

As depicted, "0s" in the file block bit map indicates that the corresponding data blocks between a base file for the selected candidate file in prior image layer and the selected candidate file in the container layer are the same. Further, "1s" in the file block bit map indicates that the corresponding data blocks between a base file for the candidate file in prior image layer and the selected candidate file in the container layer are different. In step 1002, the file block bit map for the selected candidate file is created with "0" in all of entries in the file block for the initial state. In other examples, other values can be used to initialize the file block bit map such as a null value or some other suitable value.

The process identifies a base file for the selected candidate file in a prior image layer using comparison data structure for the selected candidate file (step 1004). In step 1004, the process searches layers of previous copy columns from the top row to bottom row in the comparison data structure for the selected candidate file to identify a base file for the selected candidate file in a prior image layer for comparison.

The process compares the identified base file for the selected candidate file with the selected candidate file in the container layer (step 1006). In step 1006, each data block in the identified base file for the selected candidate file is compared with a corresponding data block in the selected candidate file in the container layer to determine whether the compared data blocks are duplicated data blocks. In this illustrative example, data blocks that have been determined to be duplicated data blocks in previous comparisons are not compared.

The process updates the file block bit map for the selected candidate file in the container layer based on the comparison (step 1008). In step 1008, the file block bit map is updated with "0" for each data block that corresponds to a duplicated data block between the selected candidate file in the container layer and the identified base file for the selected candidate file. In addition, the file block bit map is updated with "1" for each data block that corresponds to a different data block between the selected candidate file in the container layer and the identified base file for the selected candidate file.

The process updates the same data range column in the comparison data structure for the selected candidate file (step 1010). In step 1010, the same data range column is updated based on the duplicated data blocks between the selected candidate file in the container layer and the identified base file for the selected candidate file. In this example, the column for previous copy layer is updated with information includes an identifier for image layer containing the duplicated data blocks and an identifier to indicate which portion of file block bit map for the selected candidate file in the container layer contains the duplicated data blocks.

The process outputs the updated comparison data structure and the updated file block bit map for the selected candidate file in the container layer (step 1012). The process determines whether another base file for the selected candidate file is present in a different image layer for processing using the comparison data structure (step 1014). If another base file for the selected candidate file in a different image layer can be identified for processing, the process returns to step 1004 and repeat step 1004 to step 1014 until all of the base files for the selected candidate file in all image layers have been identified for processing.

On the other hand, if all base files for the selected candidate file in all image layers have been processed, the process proceeds to generate a delta data file for the selected candidate file in the container layer (step 1016). In step 1016, the process generates the delta data file by deleting all data that correspond to duplicated data blocks from the file block bit map for the selected candidate file in container layer. In other words, the delta data file contains the delta data for the selected candidate file in the container layer. This delta data file only includes data blocks that are different from data blocks in all other image layers.

In one illustrative example, the delta data file for the selected candidate file in the container layer can be stored in the container layer in form of an Inode. In this example, the Inode serves as a pointer that points to actual delta data saved in storage such as a memory.

The process outputs the comparison data structure, the delta data file, and the file block bit map for the selected candidate file in container layer (step 1018). The process terminates thereafter.

Figure 11:
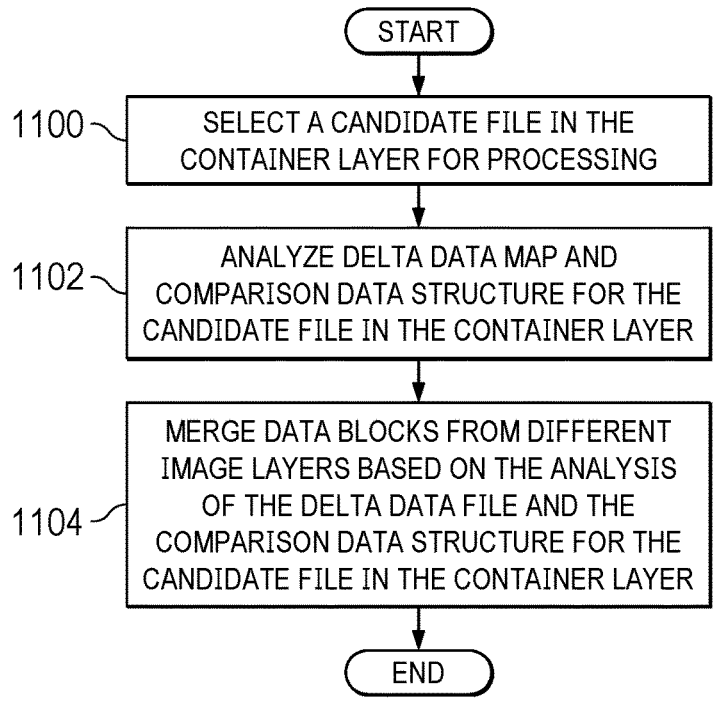
FIG. 11 is a flowchart of a process for merging portions of a candidate file depicted in accordance with an illustrative embodiment.

Turning next to FIG. 11, a flowchart of a process for merging portions of a candidate file is depicted in accordance with an illustrative embodiment. The process in FIG. 11 can be implemented in hardware, software, or both. When implemented in software, the process can take the form of program instructions that are run by one of more processor units located in one or more hardware devices in one or more computer systems. For example, the process can be implemented in image manager 214 in computer system 212 in FIG. 2. The process in FIG. 11 is an example of steps that can be used in an implementation for merge stage 801 in FIG. 8.

The process begins by selecting a candidate file in the container layer for processing (step 1100). The process analyzes delta data map and comparison data structure for the candidate file in the container layer (step 1102). As depicted, delta data map includes file block bit map that can be used to identify the portions of candidate file that are the same as a base file in a prior image layer, and the portions of the code file that are different from the base file in the prior image layer. In addition, comparison data structure for the candidate file can be used to identify image layers that contain data blocks for merging the candidate file. In this example, the candidate file can be subsequently read, accessed or modified.

The process merges data blocks for different image layers based on the analysis of the delta data map and the comparison data structure for the candidate file in the container layer (step 1104). The process terminates thereafter. In step 1104, data blocks from base files for the selected candidate file in multiple image layers are merged into data blocks for the delta data in the most updated version of the candidate file that can be viewed or modified.

Figure 12:
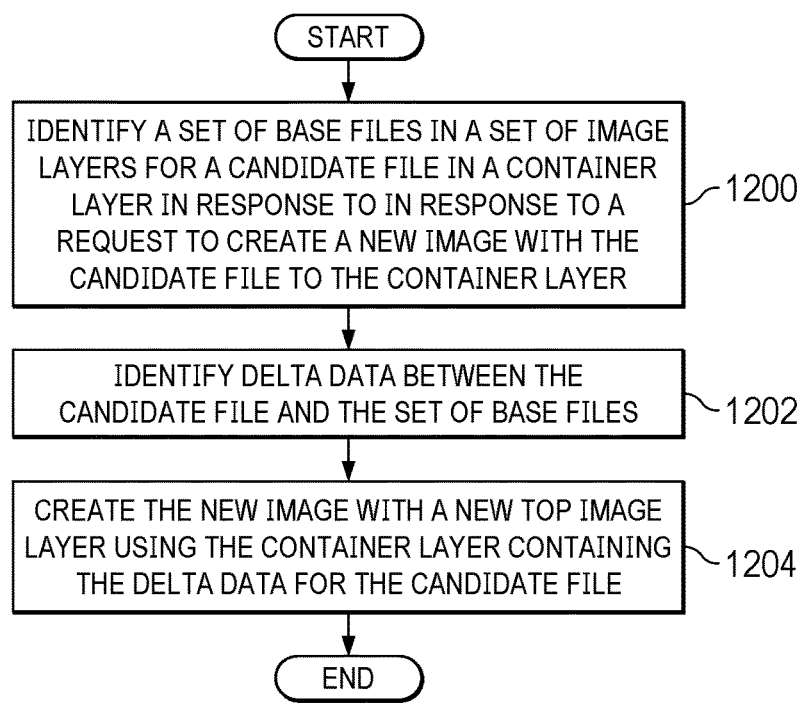
FIG. 12 is a flowchart of a process for managing an image in accordance with an illustrative embodiment.

Turning next to FIG. 12, a flowchart of a process for managing an image is depicted in accordance with an illustrative embodiment. The process in FIG. 12 can be implemented in hardware, software, or both. When implemented in software, the process can take the form of program instructions that are run by one of more processor units located in one or more hardware devices in one or more computer systems. For example, the process can be implemented in image manager 214 in computer system 212 in FIG. 12.

The process begins by identifying a set of base files in a set of image layers for a candidate file in a container layer in response to a request to create a new image with the candidate file to the container layer (step 1200). The process identifies delta data between the candidate file and the set of base files (step 1202).

The process creates the new image with a new top image layer using the container layer containing the delta data for the candidate file (step 1204). The process terminates thereafter.

Figure 13:
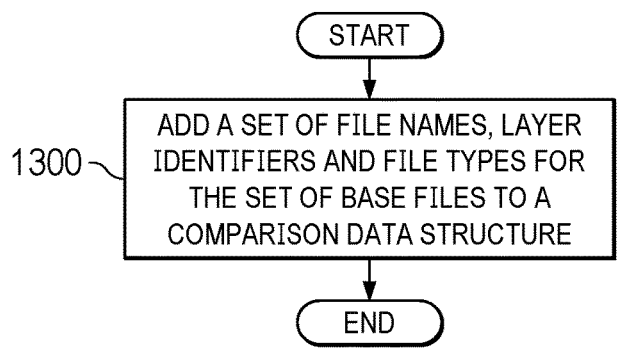
FIG. 13 is a flowchart of process for identifying base files in accordance with an illustrative embodiment.

Turning now to FIG. 13, a flowchart of process for identifying base files is depicted in accordance with an illustrative embodiment. The process in this flowchart is an example of an implementation for step 1200 in FIG. 12.

The process adds a set of file names, layer identifiers and file types for the set of base files to a comparison data structure (step 1300). The process terminates thereafter.

Figure 14:
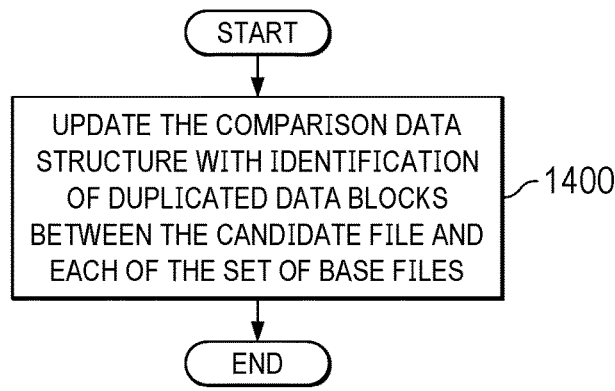
FIG. 14 is a flowchart of a process for updating a comparison data structure in accordance with an illustrative embodiment.

With reference to FIG. 14, a flowchart of a process for updating a comparison data structure is depicted in accordance with an illustrative embodiment. The process in this flowchart is an example of an additional step that can be performed with step 1300 in FIG. 13.

The process updates the comparison data structure with identification of duplicated data blocks between the candidate file and each of the set of base files (step 1400). The process terminates thereafter.

Figure 15:
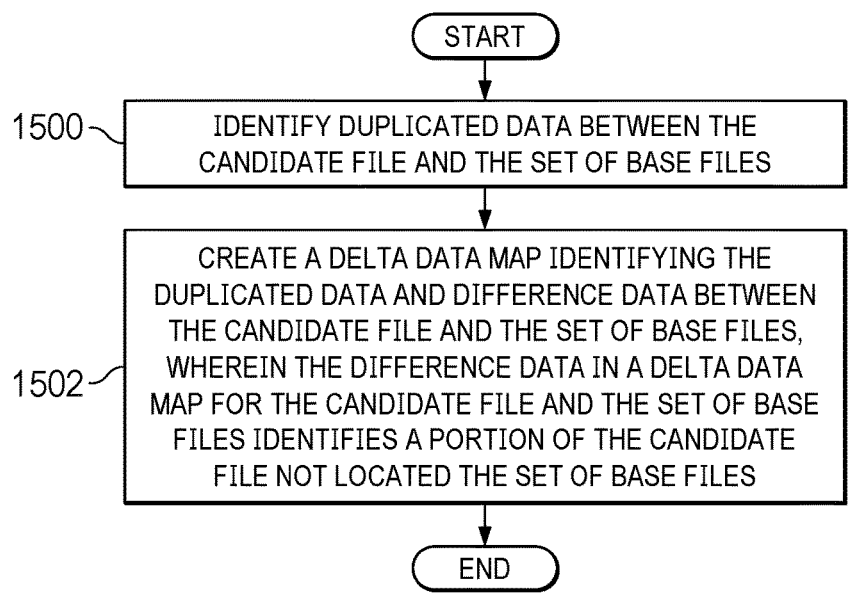
FIG. 15 is a flowchart of process for identifying delta data in accordance with an illustrative embodiment.

Next in FIG. 15, a flowchart of process for identifying delta data is depicted in accordance with an illustrative embodiment. FIG. 15 is an example of an implementation for step 1202 in FIG. 12.

The process identifies duplicated data between the candidate file and the set of base files (step 1500). The process creates a delta data map identifying the duplicated data and difference data between the candidate file and the set of base files, wherein the difference data in a delta data map for the candidate file and the set of base files identifies a portion of the candidate file not located in the set of base files (step 1502). The process terminates thereafter.

Figure 16:
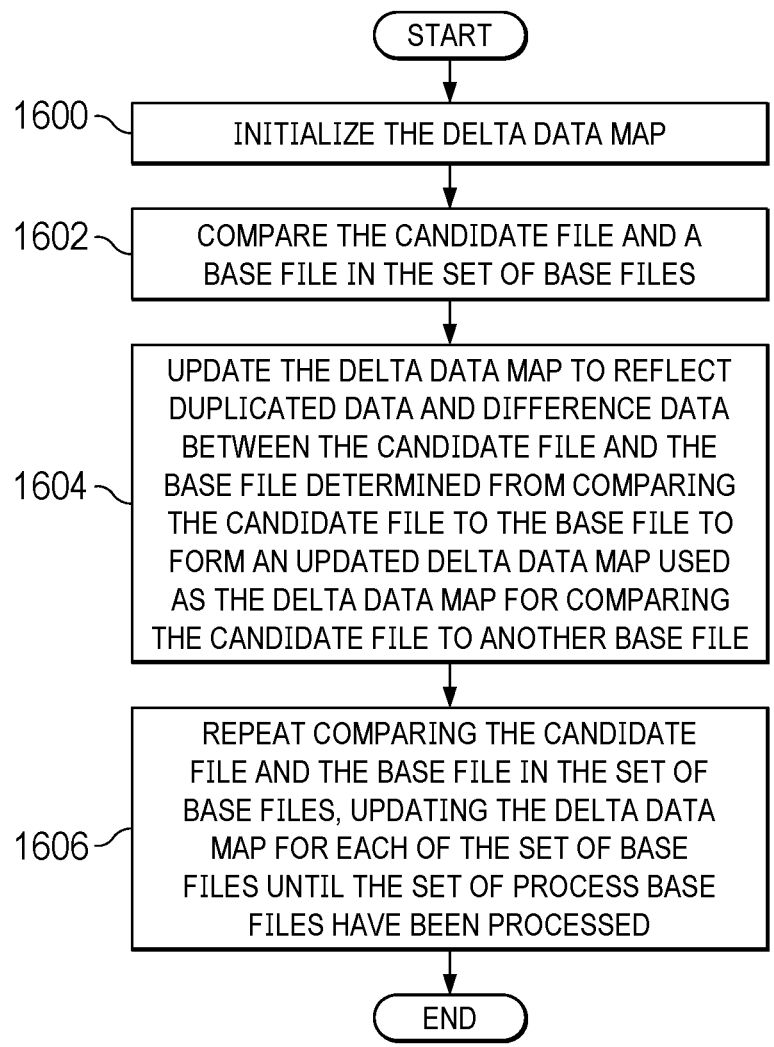
FIG. 16 is a flowchart of a process for creating a delta data map in accordance with an illustrative embodiment.

With reference to FIG. 16, a flowchart of a process for creating a delta data map is depicted in accordance with an illustrative embodiment. The process in this figure is an example of an implementation for step 1502 in FIG. 15.

The process initializes the delta data map (step 1600). When initialized for use, delta data map comprises all of the same value. For example, a null value or logic "0" can be based at each of the entries of the delta data map as part of the initialization process.

The process compares the candidate file and a base file in the set of base files (step 1602). The process updates the delta data map to reflect duplicated data and difference data between the candidate file and the base file determined from comparing the candidate file to the base file to form an updated delta data map used as the delta data map for comparing the candidate file to another base file (step 1604). The delta data map is updated to reflect duplicated data and difference data between the candidate file and the base file determined from comparing the candidate file to the base file. this update forms an updated delta data map is used as the delta data map for comparing the candidate file to another base file.

The process repeats comparing the candidate file and the base file in the set of base files, updating the delta data map for each of the set of base files until the set of base files have been processed (step 1606). The process terminates thereafter. In this example, the delta data map is updated each time a base file is compared to the candidate file. The final version of the delta data map identifies the duplicated data in the candidate file that can be found from one or more of the set of base files. Additionally, this delta data map identifies the delta data for use in the new image layer for the candidate file.

Figure 17:
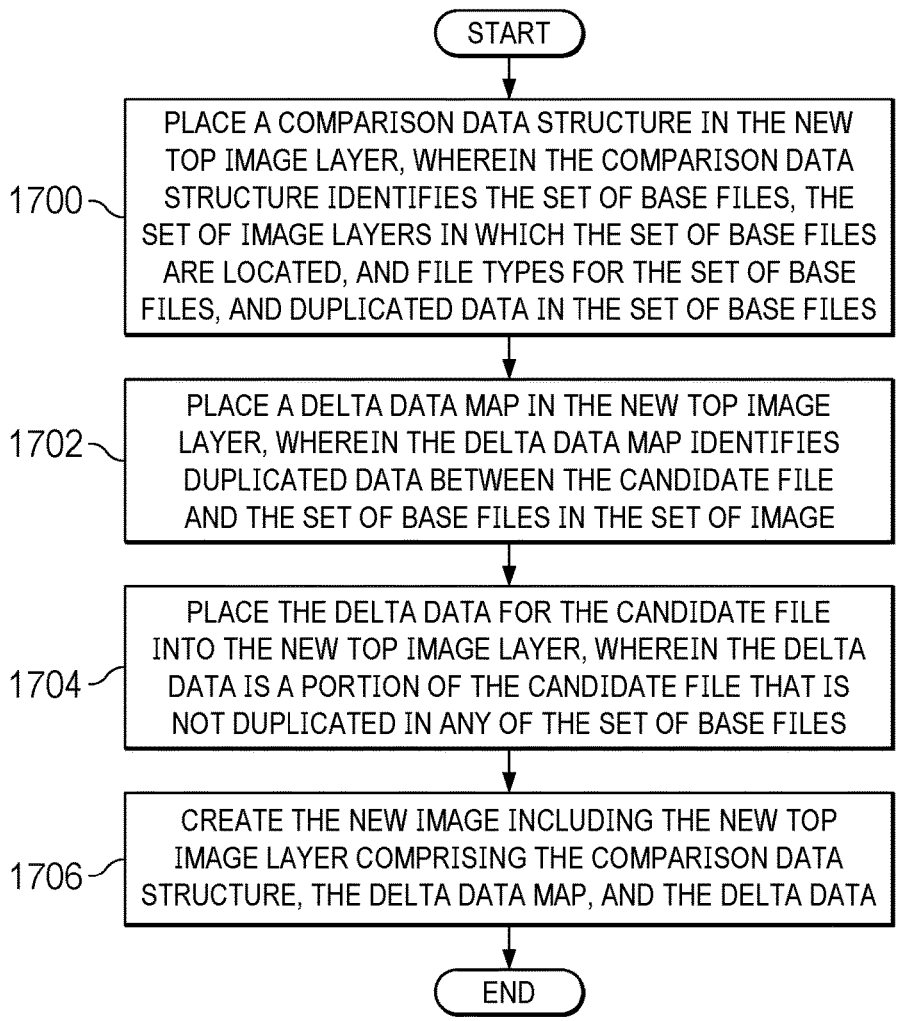
FIG. 17 is a flowchart of a process for creating a candidate file from an image in accordance with an illustrative embodiment.

Turning to FIG. 17, a flowchart of a process for creating a candidate file from an image is depicted in accordance with an illustrative embodiment. The process in this figure is an example of an implementation for step 1204 in FIG. 12.

The process begins by placing a comparison data structure in the new top image layer, wherein the comparison data structure identifies the set of base files, the set of image layers in which the set of base files are located, and file types for the set of base files, and duplicated data in the set of base files (step 1700). The process places a delta data map in the new top image layer, wherein the delta data map identifies duplicated data between the candidate file and the set of base files in the set of image layers (step 1702). The process places the delta data for the candidate file into the new top image layer, wherein the delta data is a portion of the candidate file that is not duplicated in any of the set of base files (step 1704).

The process creates the new image including the new top image layer comprising the comparison data structure, the delta data map, and the delta data (step 1706). The process terminates thereafter.

Figure 18:
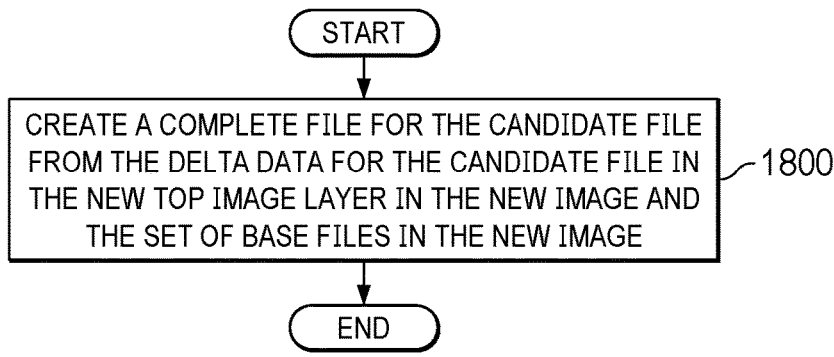
FIG. 18 is a flowchart of a process for creating a candidate file from an image in accordance with an illustrative embodiment.

Turning to FIG. 18, a flowchart of a process for creating a candidate file from an image is depicted in accordance with an illustrative embodiment. The process in this figure is an example of additional steps that can be performed in steps in FIG. 12. In this figure, new top image layer further comprises a comparison data structure identifying duplicated data between the candidate file and the set of base files, a delta data map that identifies the duplicated data and difference data for the candidate file that is not duplicated in the set of the base files.

The process creates a complete file for the candidate file from the delta data for the candidate file in the new top image layer in the new image and the set of base files in the new image (step 1800). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 19:
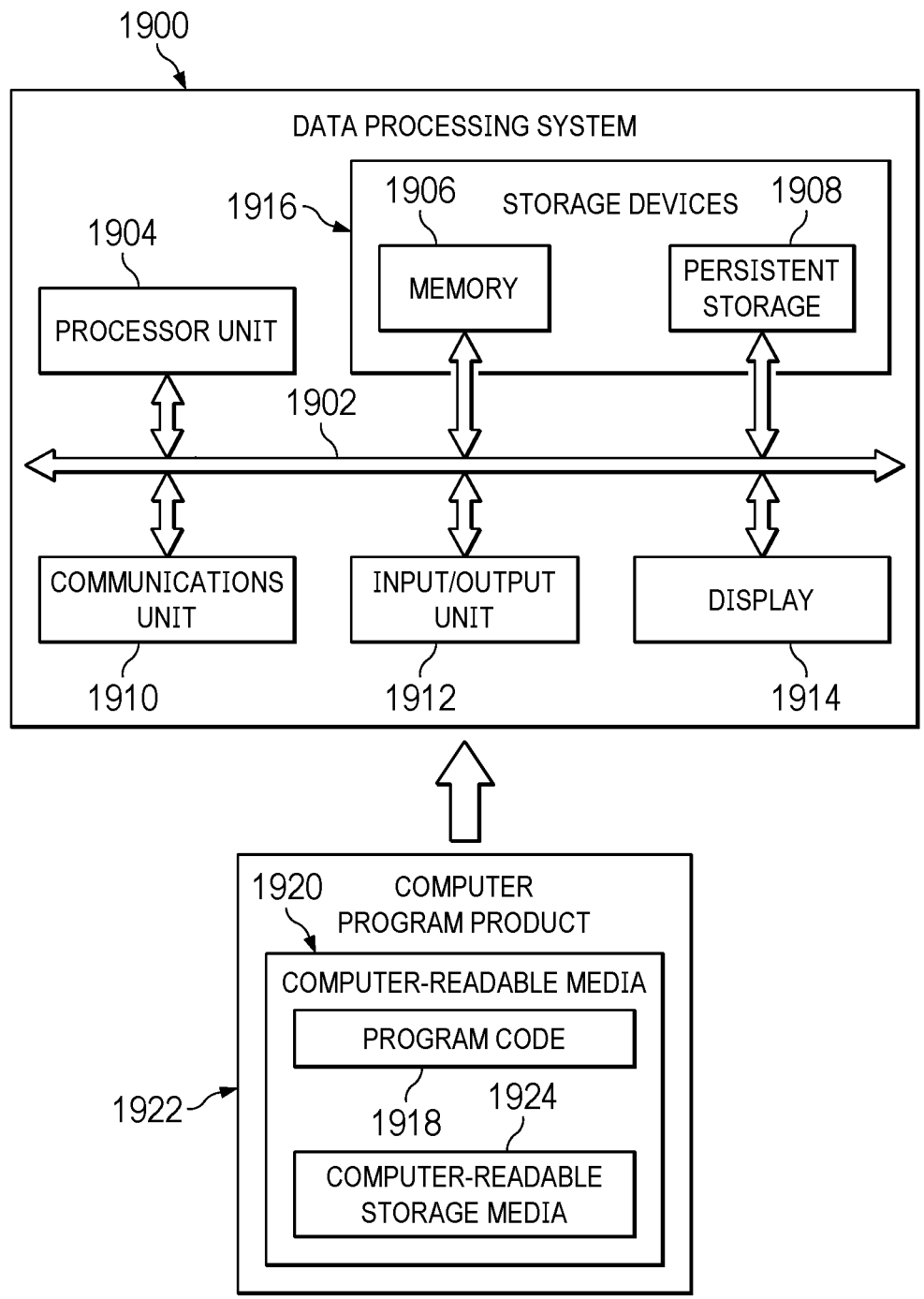
FIG. 19 is a block diagram of a data processing system in accordance with an illustrative embodiment.

Turning now to FIG. 19, a block diagram of a data processing system is depicted in accordance with an illustrative embodiment. Data processing system 1900 can be used to implement computers and computing devices in computing environment 100 in FIG. 1. Data processing system 1900 can also be used to implement computer system 212 in FIG. 2. In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1904 can be implemented using one or more heterogeneous processor systems in which a main processor is present with secondary processors on a single chip. As another illustrative example, processor unit 1904 can be a symmetric multi-processor system containing multiple processors of the same type on a single chip.

Memory 1906 and persistent storage 1908 are examples of storage devices 1916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1916 may also be referred to as computer readable storage devices in these illustrative examples. Memory 1906, in these examples, can be, for example, a random-access memory or any other suitable volatile or non-volatile storage device. Persistent storage 1908 may take various forms, depending on the particular implementation.

For example, persistent storage 1908 may contain one or more components or devices. For example, persistent storage 1908 can be a hard drive, a solid-state drive (SSD), a flash memory, a rewritable optical disk, a rewritable magnetic tape, or some combination of the above. The media used by persistent storage 1908 also can be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 may provide a connection for user input through at least one of a keyboard, a mouse, or some other suitable input device. Further, input/output unit 1912 may send output to a printer. Display 1914 provides a mechanism to display information to a user.

Instructions for at least one of the operating system, applications, or programs can be located in storage devices 1916, which are in communication with processor unit 1904 through communications framework 1902. The processes of the different embodiments can be performed by processor unit 1904 using computer-implemented instructions, which may be located in a memory, such as memory 1906.

These instructions are referred to as program instructions, computer usable program instructions, or computer readable program instructions that can be read and executed by a processor in processor unit 1904. The program instructions in the different embodiments can be embodied on different physical or computer readable storage media, such as memory 1906 or persistent storage 1908.

Program instructions 1918 are located in a functional form on computer readable media 1920 that is selectively removable and can be loaded onto or transferred to data processing system 1900 for execution by processor unit 1904. Program instructions 1918 and computer readable media 1920 form computer program product 1922 in these illustrative examples. In the illustrative example, computer readable media 1920 is computer readable storage media 1924.

Computer readable storage media 1924 is a physical or tangible storage device used to store program instructions 1918 rather than a medium that propagates or transmits program instructions 1918. Computer readable storage media 1924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1918 can be transferred to data processing system 1900 using a computer readable signal media. The computer readable signal media are signals and can be, for example, a propagated data signal containing program instructions 1918. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1920" can be singular or plural. For example, program instructions 1918 can be located in computer readable media 1920 in the form of a single storage device or system. In another example, program instructions 1918 can be located in computer readable media 1920 that is distributed in multiple data processing systems. In other words, some instructions in program instructions 1918 can be located in one data processing system while other instructions in program instructions 1918 can be located in one data processing system. For example, a portion of program instructions 1918 can be located in computer readable media 1920 in a server computer while another portion of program instructions 1918 can be located in computer readable media 1920 located in a set of client computers.

The different components illustrated for data processing system 1900 are not meant to provide architectural limitations to the manner in which different embodiments can be implemented. In some illustrative examples, one or more of the components may be incorporated in or otherwise form a portion of, another component. For example, memory 1906, or portions thereof, may be incorporated in processor unit 1904 in some illustrative examples. The different illustrative embodiments can be implemented in a data processing system including components in addition to or in place of those illustrated for data processing system 1900. Other components shown in FIG. 19 can be varied from the illustrative examples shown. The different embodiments can be implemented using any hardware device or system capable of running program instructions 1918.

Thus, illustrative embodiments provide a computer implemented method, computer system, and computer program product for managing images. In one illustrative example, A computer implemented method manages an image. A number of processor units identifies a set of base files in a set of image layers for a candidate file in a container layer in response to a request to create a new image with the candidate file. The number of processor units identifies delta data between the candidate file and the set of base files. The number of processor units creates the new image with a new top image layer using the delta data identified for the candidate file in the container layer.

As a result, the illustrative embodiments provide a technical effect of reducing the size of images and reducing storage space used to store the images. With this ability to store versions of files using delta data rather than needing complete files in every image layer for the different versions, the size of images can be reduced. This reduction in image size results in using less storage space. Further, with smaller image sizes, amount of bandwidth needed to transfer Thus, when thousands or millions of images over network over network connections is reduced. As result, less network resources are needed. In this manner, image architecture used for image layers in the different illustrative examples can reduce resource usage.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing an image, the computer implemented method comprising:
   identifying, by a number of processor units, a set of base files in a set of image layers for a candidate file in a container layer by adding a set of file names, layer identifiers, and file types for the set of base files to a comparison data structure in response to a request to create a new image with the candidate file;
   identifying, by the number of processor units, delta data between the candidate file and the set of base files; and
   creating, by the number of processor units, the new image with a new top image layer using the delta data identified for the candidate file in the container layer.

2. The computer implemented method of claim 1 further comprising:
   updating, by the number of processor units, the comparison data structure with identification of duplicated data between the candidate file and each of the set of base files.

3. The computer implemented method of claim 1, wherein identifying, by the number of processor units, the delta data comprises:
   identifying, by the number of processor units, duplicated data between the candidate file and the set of base files; and
   creating, by the number of processor units, a delta data map identifying the duplicated data and difference data between the candidate file and the set of base files, wherein the duplicated data in the delta data map for the candidate file and the set of base files comprises a portion of the candidate file not located in the set of base files.

4. The computer implemented method of claim 3, wherein creating, by the number of processor units, the delta data map comprises:
   initializing, by the number of processor units, the delta data map;
   comparing, by the number of processor units, the candidate file and a selected base file in the set of base files;
   updating, by the number of processor units, the delta data map to reflect duplicated data and difference data between the candidate file and the selected base file determined from comparing the candidate file to the selected base file to form an updated delta data map used as the delta data map for comparing the candidate file to another base file; and
   repeating, by the number of processor units, comparing the candidate file and the another base file in the set of base files, updating the updated delta data map for each of the set of base files until the set of base files have been processed.

5. The computer implemented method of claim 4, wherein a block by block comparison of first data blocks in the candidate file and second data blocks in the set of base files is performed to identify the duplicated data and the difference data.

6. The computer implemented method of claim 1, wherein creating, by the number of processor units, the new image comprises:
   placing, by the number of processor units, the comparison data structure in the new top image layer, wherein the comparison data structure identifies the set of base files, the set of image layers in which the set of base files are located, and file types for the set of base files, and duplicated data in the set of base files;
   placing, by the number of processor units, a delta data map in the new top image layer, wherein the delta data map identifies duplicated data between the candidate file and the set of base files in the set of image layers;
   placing, by the number of processor units, the delta data for the candidate file into the new top image layer, wherein the delta data is a portion of the candidate file that is not duplicated in any of the base files; and
   creating, by the number of processor units, the new image including the new top image layer comprising the comparison data structure, the delta data map, and the delta data.

7. The computer implemented method of claim 1, wherein the new top image layer further comprises the comparison data structure identifying duplicated data between the candidate file and the set of base files, a delta data map that identifies the duplicated data and difference data for the candidate file that is not duplicated in the set of the base files and further comprising:
   creating, by the number of processor units, a complete file for the candidate file from the delta data for the candidate file in the new top image layer in new image and the set of base files in the new image.

8. The computer implemented method of claim 1, wherein the delta data is included in the new top image layer using at least one of a file containing the delta data, an index node, or a pointer to the file with the delta data.

9. A computer system comprising:
   a number of processor units, wherein the number of processor units executes program instructions to:
   identify a set of base files in a set of image layers for a candidate file in a container layer by adding a set of file names, layer identifiers, and file types for the set of base files to a comparison data structure in response to a request to create a new image with the candidate file;
   identify delta data between the candidate file and the set of base files; and
   create the new image with a new top image layer using the delta data identified for the candidate file in the container layer.

10. The computer system of claim 9, wherein the number of processor units further executes the program instructions to:
   update the comparison data structure with identification of duplicated data between the candidate file and each of the set of base files.

11. The computer system of claim 9, wherein in identifying the delta data, the number of processor units further executes the program instructions to:
   identify duplicated data between the candidate file and the set of base files; and
   create a delta data map identifying the duplicated data and difference data between the candidate file and the set of base files, wherein the duplicated data in the delta data map for the candidate file and the set of base files comprises a portion of the candidate file not located in the set of base files.

12. The computer system of claim 11, wherein in creating the delta data map, the number of processor units further executes the program instructions to:
   initialize the delta data map;
   compare the candidate file and a selected base file in the set of base files;
   update the delta data map to reflect duplicated data and difference data between the candidate file and the selected base file determined from comparing the candidate file to the selected base file to form an updated delta data map used as the delta data map for comparing the candidate file to another base file; and
   repeat comparing the candidate file and the another base file in the set of base files, updating the updated delta data map for each of the set of base files until the set of base files have been processed.

13. The computer system of claim 12, wherein a block by block comparison of first data blocks in the candidate file and second data blocks in the set of base files is performed to identify the duplicated data and the difference data.

14. The computer system of claim 9, wherein in creating the new image, the number of processor units further executes the program instructions to:
   place the comparison data structure in the new top image layer, wherein the comparison data structure identifies the set of base files, the set of image layers in which the set of base files are located, and file types for the set of base files, and duplicated data in the set of base files;
   place a delta data map in the new top image layer, wherein the delta data map identifies duplicated data between the candidate file and the set of base files in the set of image layers;
   place the delta data for the candidate file into the new top image layer, wherein the delta data is a portion of the candidate file that is not duplicated in any of the base files; and
   create the new image including the new top image layer comprising the comparison data structure, the delta data map, and the delta data.

15. The computer system of claim 9, wherein the new top image layer further comprises the comparison data structure identifying duplicated data between the candidate file and the set of base files, a delta data map that identifies the duplicated data and difference data for the candidate file that is not duplicated in the set of the base files and wherein the number of processor units further executes the program instructions to:
   create a complete file for the candidate file from the delta data for the candidate file in the new top image layer in new image and the set of base files in the new image.

16. The computer system of claim 9, wherein the delta data is included in the new top image layer using at least one of a file containing the delta data, an index node, or a pointer to the file with the delta data.

17. A computer program product for managing an image, the computer program product comprising a computer readable storage medium having program instructions embodied therewith, the program instructions executable by a computer system to cause the computer system to:
   identify a set of base files in a set of image layers for a candidate file in a container layer by adding a set of file names, layer identifiers, and file types for the set of base files to a comparison data structure in response to a request to create a new image with the candidate file;
   identify delta data between the candidate file and the set of base files; and
   create the new image with a new top image layer using the delta data identified for the candidate file in the container layer.

18. The computer program product of claim 17, wherein the new top image layer further comprises the comparison data structure identifying duplicated data between the candidate file and the set of base files, a delta data map that identifies the duplicated data and difference data for the candidate file that is not duplicated in the set of the base files and wherein the program instructions are executable by a computer system to cause the computer system to:
   create a complete file for the candidate file from the delta data for the candidate file in the new top image layer in new image and the set of base files in the new image.

* * * * *